US012309566B2

(12) United States Patent
Lastrucci et al.

(10) Patent No.: US 12,309,566 B2
(45) Date of Patent: May 20, 2025

(54) SOUND DIFFUSER AND A METHOD FOR DIFFUSING A SOUND THROUGH A SOUND DIFFUSER

(71) Applicant: POWERSOFT S.P.A., Scandicci (IT)

(72) Inventors: Claudio Lastrucci, Lastra a Signa (IT); Leonardo Bracciotti, Montespertoli (IT)

(73) Assignee: POWERSOFT S.P.A., Scandicci (IT)

( * ) Notice: Subject to any disclaimer, the term of this patent is extended or adjusted under 35 U.S.C. 154(b) by 210 days.

(21) Appl. No.: 18/147,211

(22) Filed: Dec. 28, 2022

(65) Prior Publication Data

US 2023/0209273 A1 Jun. 29, 2023

(30) Foreign Application Priority Data

Dec. 29, 2021 (IT) ........................ 102021000032897
Dec. 29, 2021 (IT) ........................ 102021000032906

(51) Int. Cl.
*H04R 9/02* (2006.01)
*H04R 7/18* (2006.01)
(Continued)

(52) U.S. Cl.
CPC ............... *H04R 9/025* (2013.01); *H04R 7/18* (2013.01); *H04R 9/045* (2013.01); *H04R 9/06* (2013.01); *H04R 31/006* (2013.01)

(58) Field of Classification Search
CPC .......... H04R 9/025; H04R 7/18; H04R 9/045; H04R 9/06; H04R 31/006; H04R 9/027;
(Continued)

(56) References Cited

U.S. PATENT DOCUMENTS 5,546,469 A 8/1996 Donahoe
5,802,193 A * 9/1998 Kieltyka ................ H04R 1/345 381/189

(Continued)

FOREIGN PATENT DOCUMENTS

EP 0508570 A2 10/1992
IT 102022000026061 12/2022

(Continued)

OTHER PUBLICATIONS

Italian Search Report issued in Italian Application No. 202100032897, along with English Translation of the Written Opinion, dated Aug. 31, 2022.

(Continued)

*Primary Examiner* — Mark Fischer
(74) *Attorney, Agent, or Firm* — United IP Counselors, LLC

(57) ABSTRACT

A sound diffuser includes a housing and a transducer inside the housing. The transducer includes: a coil including a plurality of turns, each lying on a respective plane (γ) transverse to a longitudinal axis; a ferromagnetic circuit, including a core provided with a central portion around which the coil is wound and an outer lateral portion located at the side of the coil and at least partly surrounding the coil, the outer lateral portion being separated from the core by an air gap extending longitudinally; and a permanent magnet inside the air gap that is caused to move parallel to the longitudinal axis when the coil is electrically energized. The sound diffuser includes a radiator coupled to the magnet so that longitudinal movement of the magnet parallel to the axis corresponds to longitudinal oscillation of the radiator along the axis.

15 Claims, 19 Drawing Sheets

(51) Int. Cl.

| | |
|---|---|
| ***H04R 9/04*** | (2006.01) |
| ***H04R 9/06*** | (2006.01) |
| ***H04R 31/00*** | (2006.01) |

(58) Field of Classification Search

CPC ........ H04R 2209/021; H04R 2209/022; H04R 2400/07

See application file for complete search history.

(56) References Cited

U.S. PATENT DOCUMENTS

| | | | | |
|---|---|---|---|---|
| 2011/0243365 | A1* | 10/2011 | Carlmark ............... | H04R 11/02 381/398 |
| 2012/0237067 | A1 | 9/2012 | Asnes | |
| 2014/0270328 | A1 | 9/2014 | Lucas et al. | |
| 2015/0256046 | A1 | 9/2015 | Lucas et al. | |
| 2015/0256911 | A1* | 9/2015 | Lucas .................... | H04R 11/02 381/390 |
| 2021/0029463 | A1* | 1/2021 | Kristiansen ............ | H04R 9/027 |

FOREIGN PATENT DOCUMENTS

| | | | | |
|---|---|---|---|---|
| JP | S5379528 A | | 7/1978 | |
| WO | 03026107 A2 | | 3/2003 | |
| WO | WO-2016020835 A1 | * | 2/2016 | ............. H04R 9/025 |

OTHER PUBLICATIONS

Italian Search Report issued in Italian Application No. 202100032906, along with English Translation of the Written Opinion, dated Aug. 31, 2022.

European Search Report for EP22216753.8, completed May 2, 2023.

* cited by examiner

Fig.10A
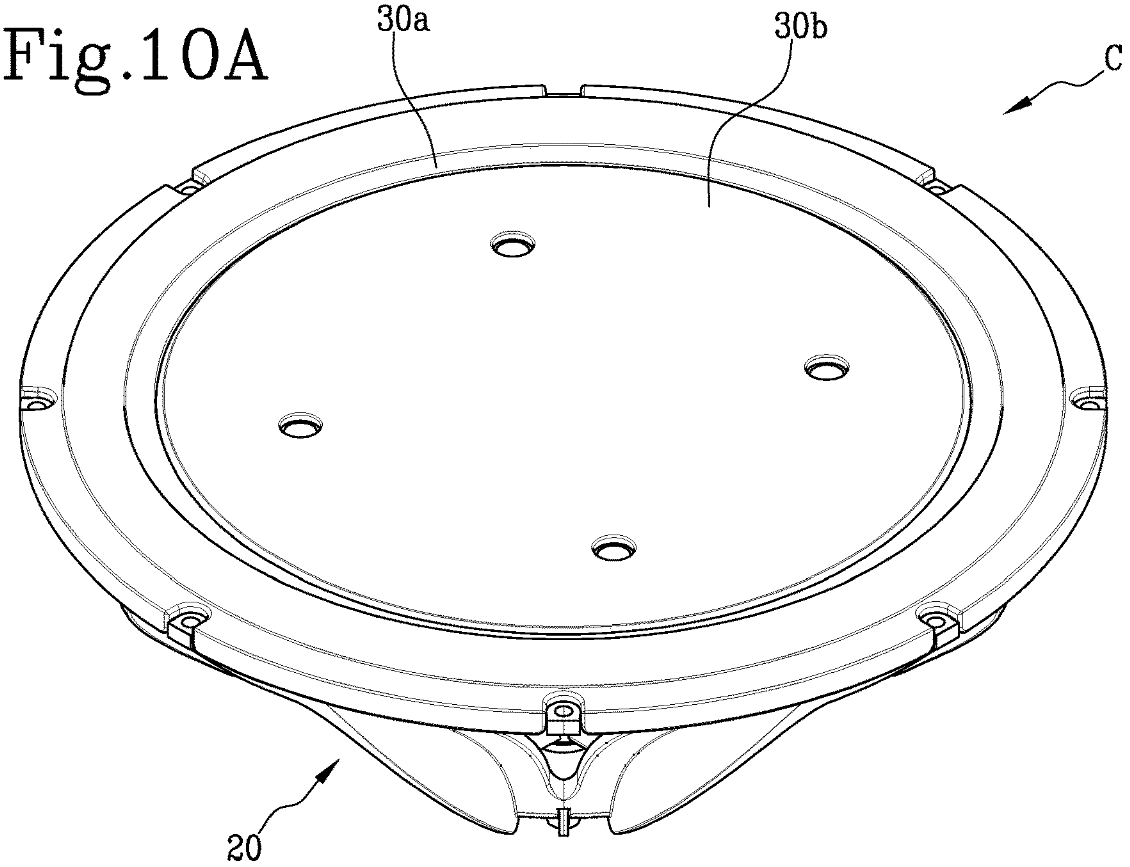
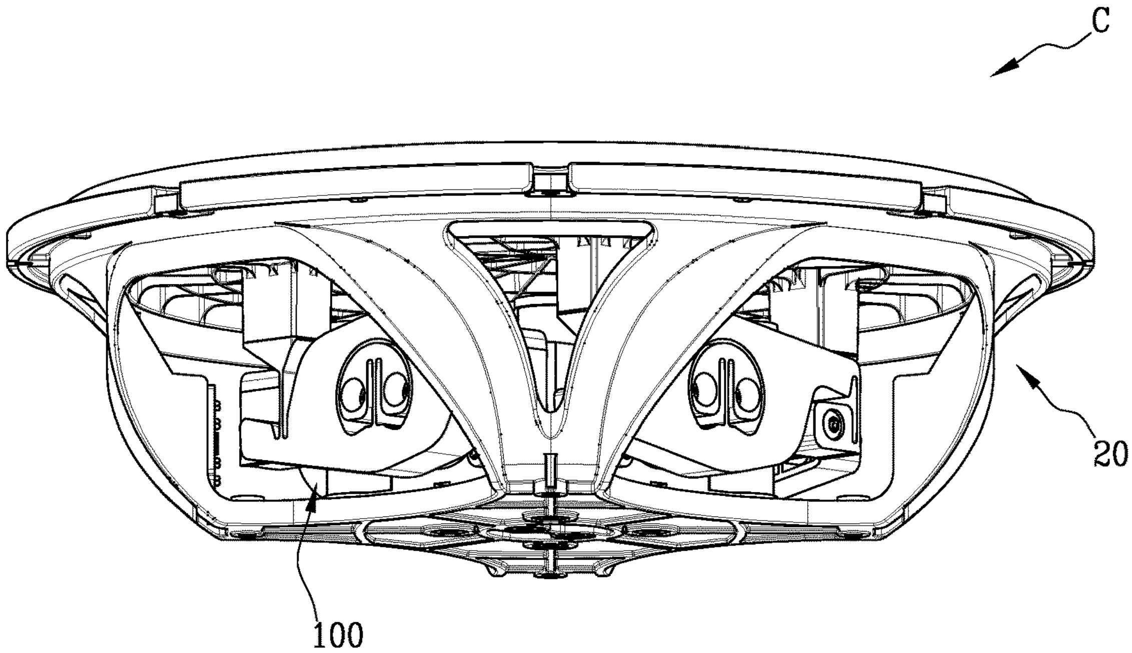
Fig.10B

Fig.10C
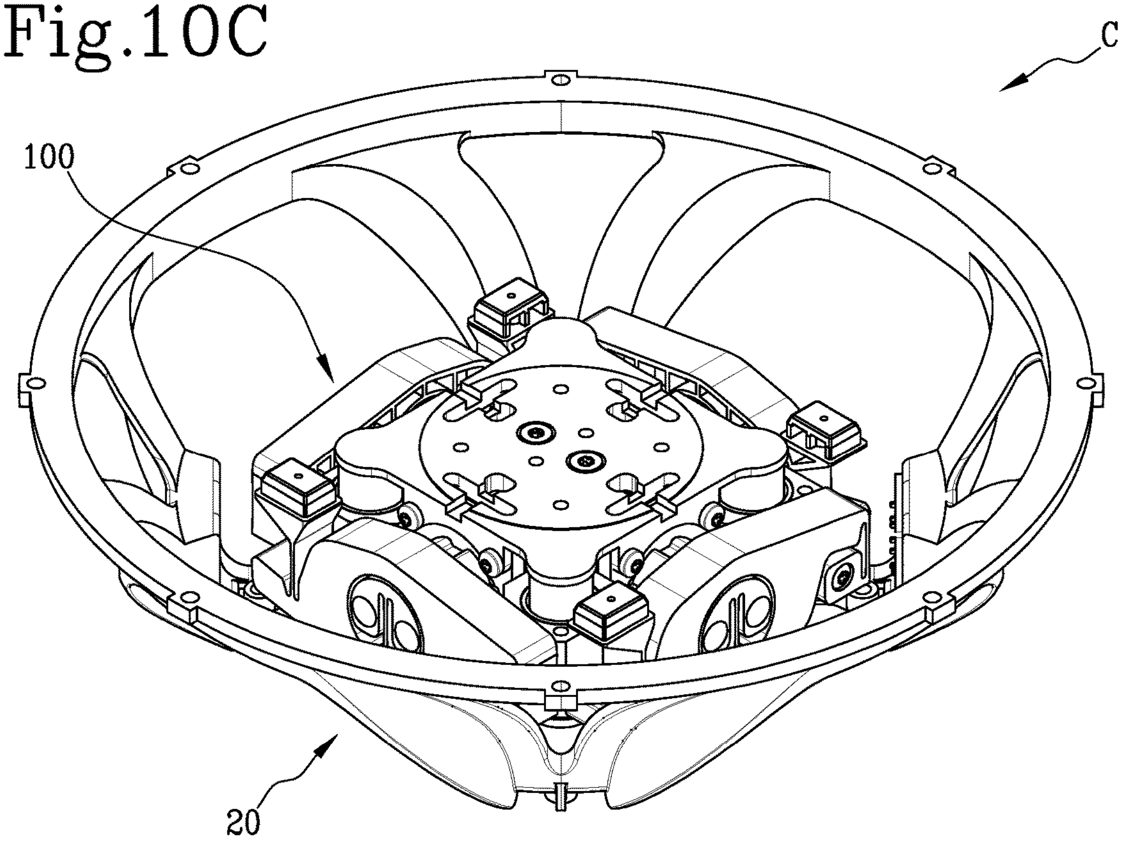
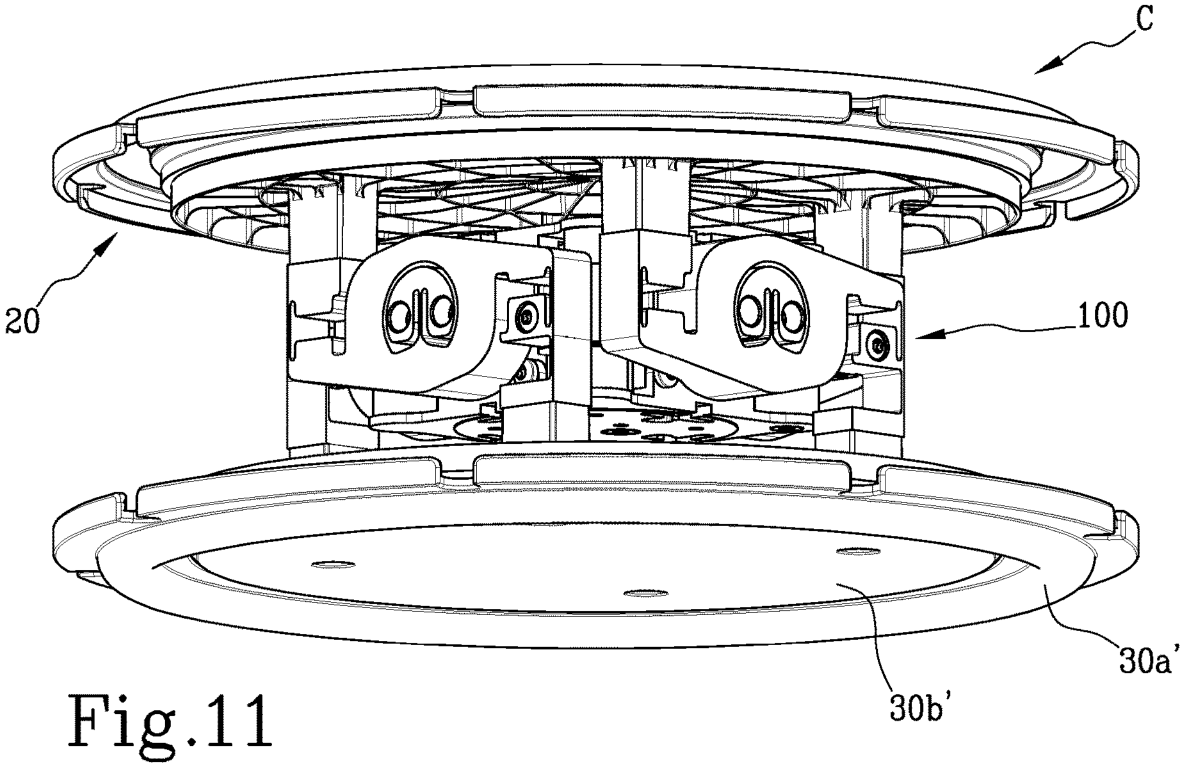
Fig.11

Fig.12A
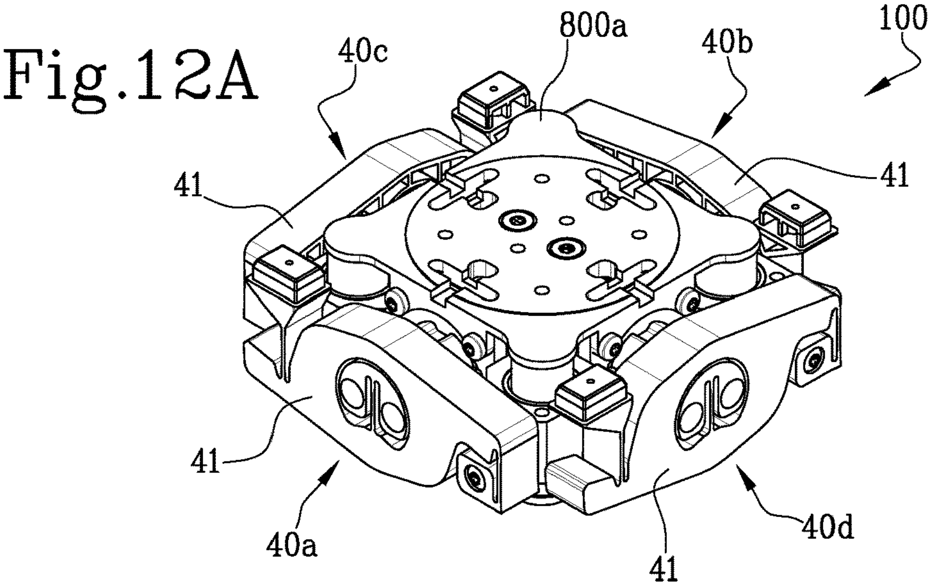
Fig.12B
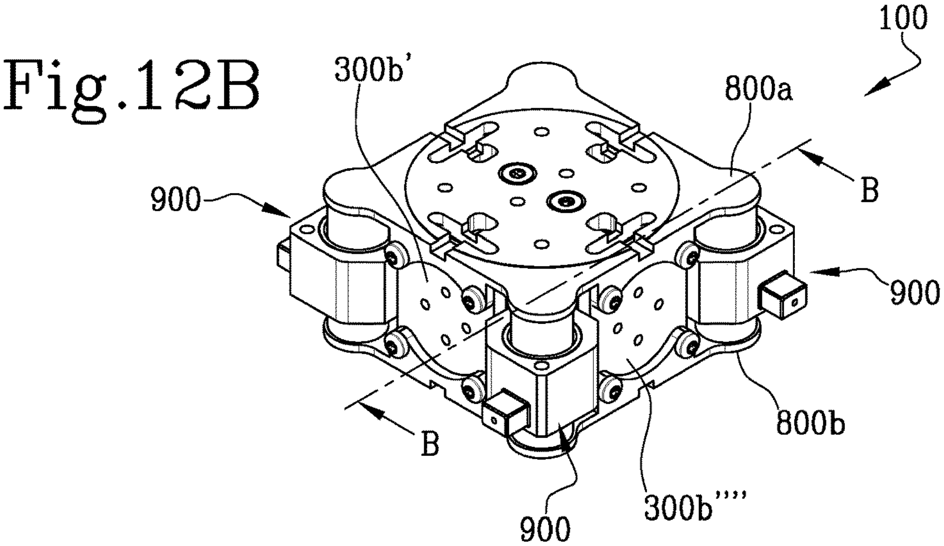
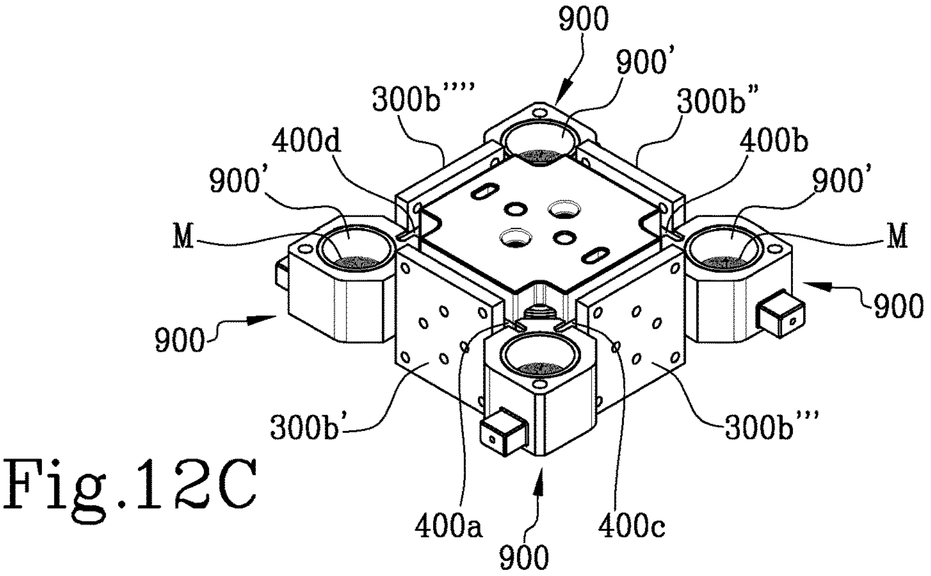
Fig.12C

Fig.12D
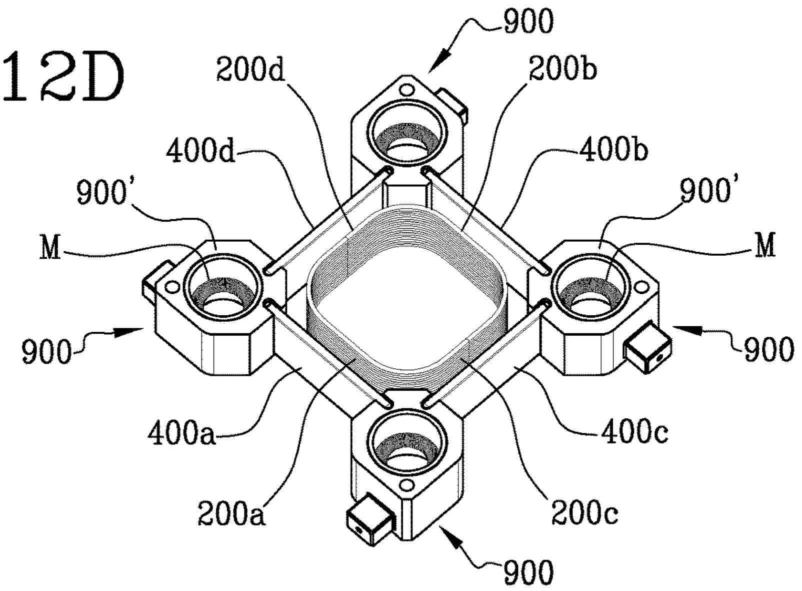
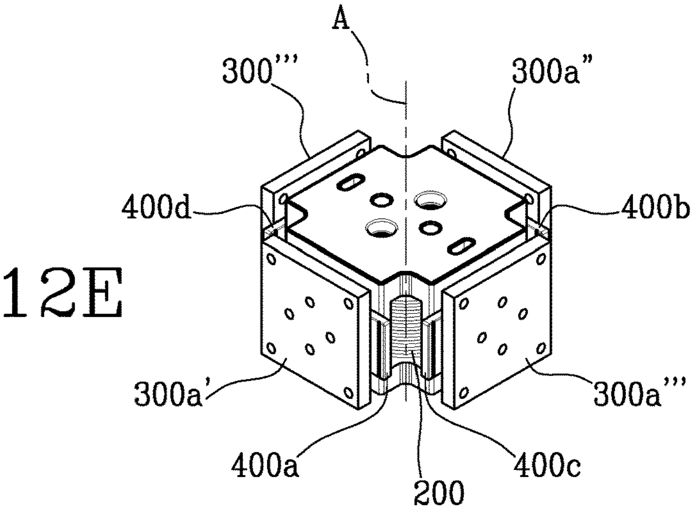
Fig.12E
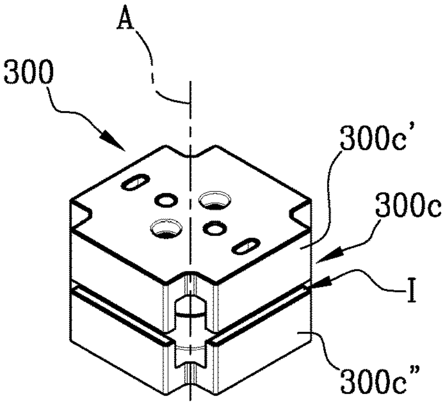
Fig.12F
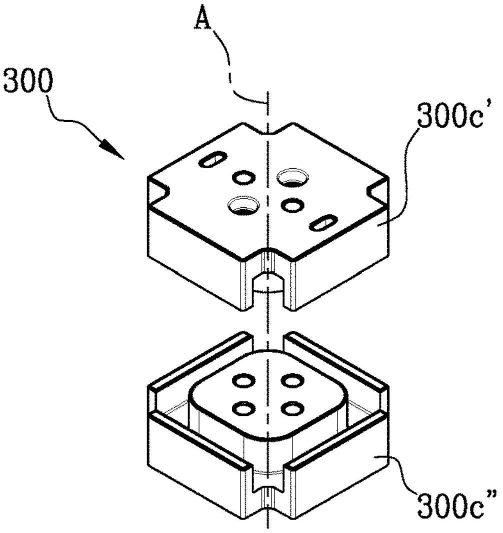
Fig.12G

Fig.13A
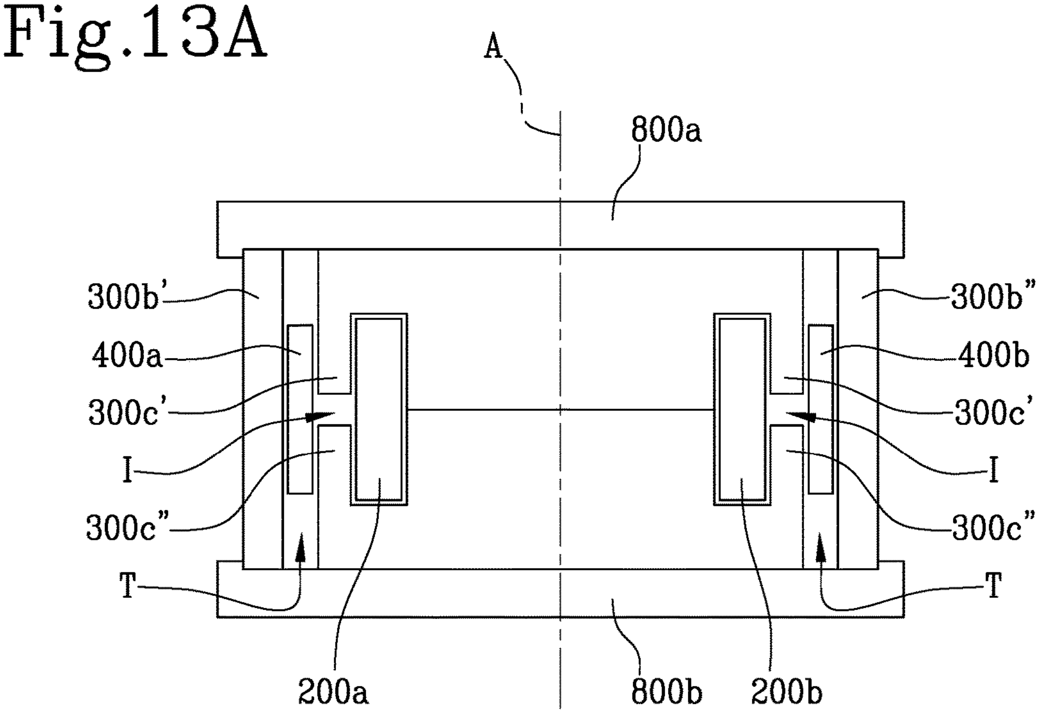
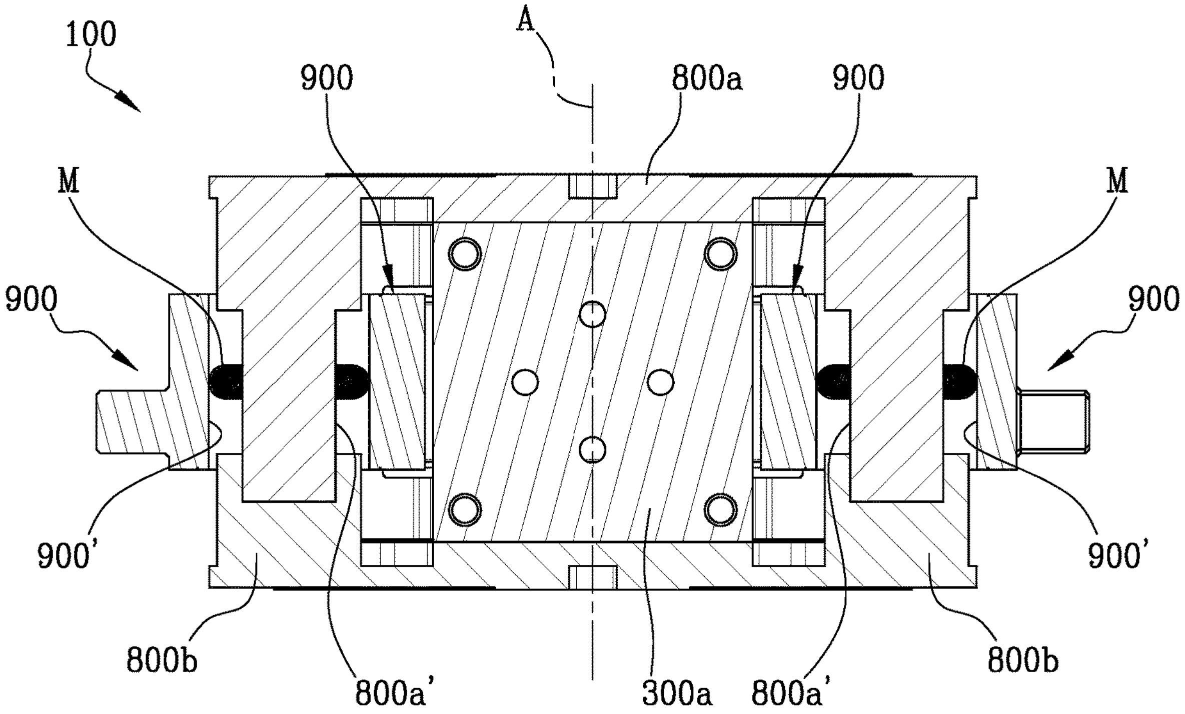
Fig.13B

Fig.14A
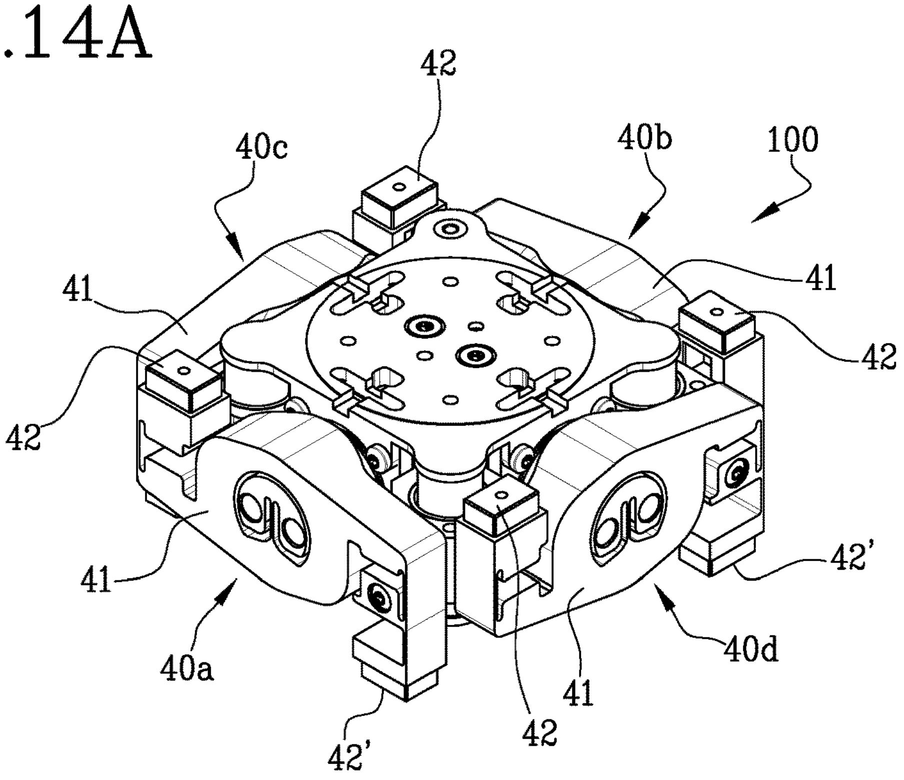
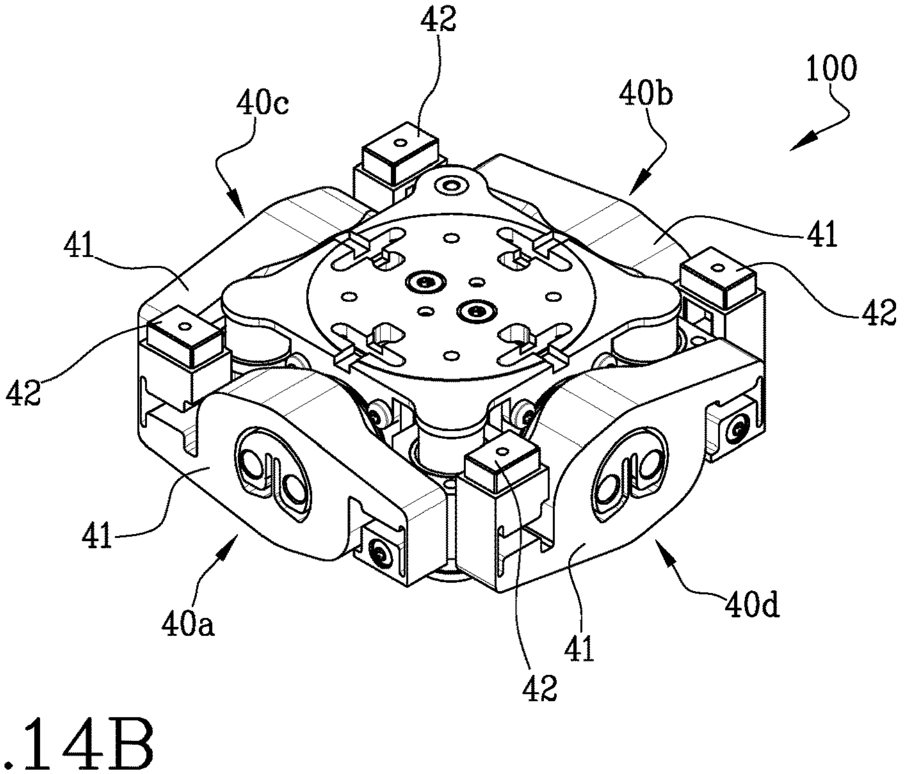
Fig.14B

Fig.14C
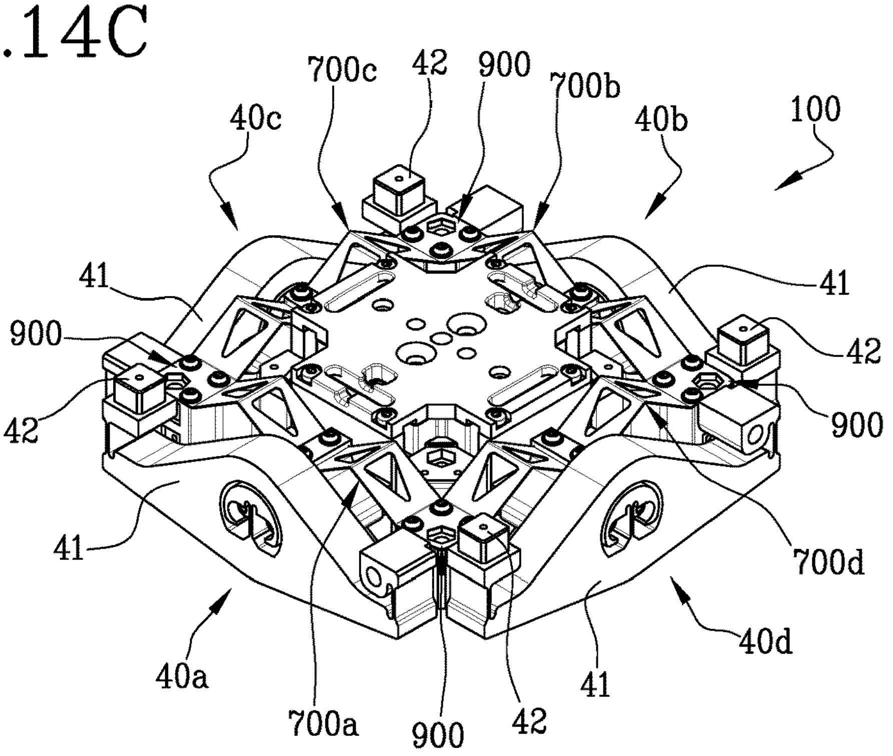
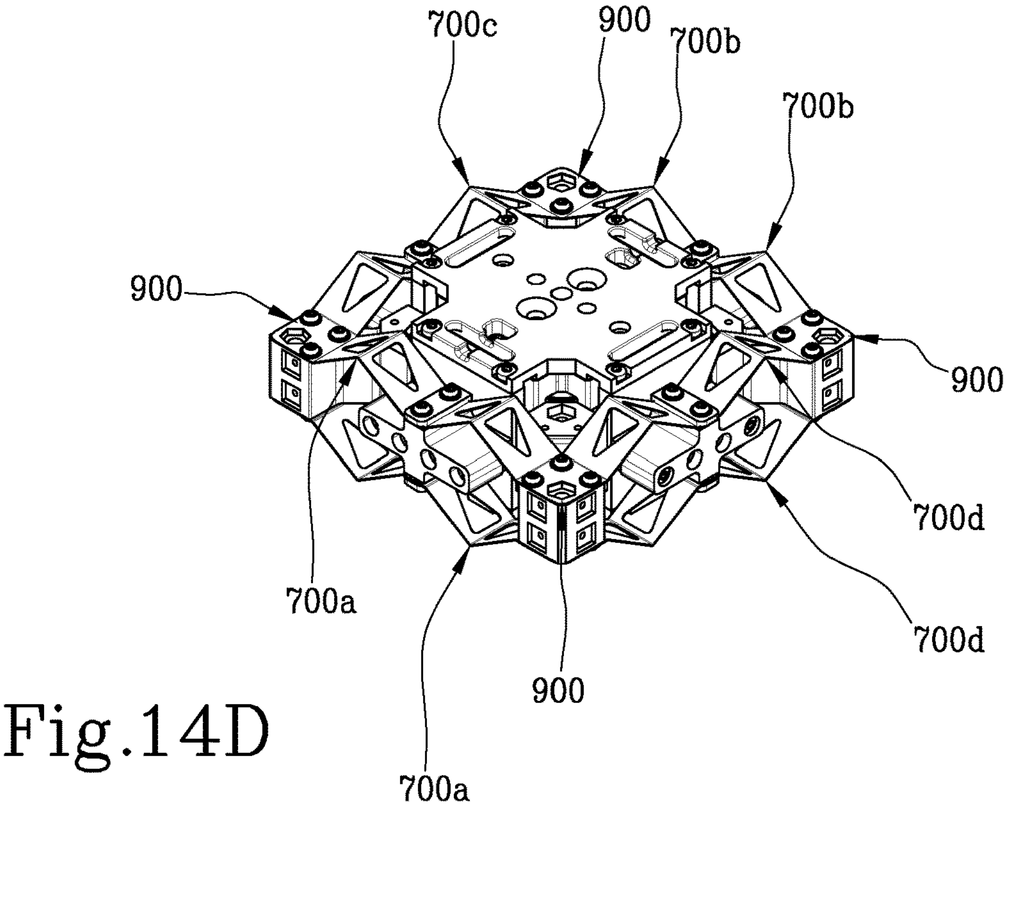
Fig.14D

SOUND DIFFUSER AND A METHOD FOR DIFFUSING A SOUND THROUGH A SOUND DIFFUSER

TECHNICAL FIELD

This invention relates to a sound diffuser and a method for diffusing a sound through a sound diffuser.

The field of the invention is that of sound reproduction systems, and in particular sound diffusers in which the need is increasingly felt to have a product which is able to provide good sound performance levels and, at the same time, is able to maintain small dimensions.

In other words, the need is increasingly felt to obtain compact diffusers but which, at the same time, are able to guarantee high acoustic performance levels in terms of the value of the SPL (Sound Pressure Level) parameter.

BACKGROUND

As is known, the sound diffusers comprise an electromechanical transducer in which a coil or the magnets are movable.

An example of these transducers is shown in patent document EP0508570A2 wherein a magnet is movable by translation within a space delimited by a core of magnetic material with low reluctance on which a coil is wound. In this situation, the coil is powered by an energizing current in such a way that the magnets are immersed in a magnetic field and translate along the vertical direction. These magnets, being associated with the membrane of the sound diffuser, cause a movement and therefore a variation of the acoustic load volumes designed to produce the sound coming out of the sound diffuser.

Disadvantageously, the transducer shown in patent document EP0508570A2 has several drawbacks linked to overall dimensions and performance levels.

In more detail, if there is a need to increase the power required for operation of the sound diffuser, the mass of the magnets increases. In this situation, their movement is particularly complex and onerous in terms of energy consumption.

Moreover, if there is a need to increase the power required for operation of the sound diffuser, the latter sees its dimensions, and consequently its weight and its cost, increase considerably.

A further drawback is due to the arrangement of the magnets relative to the coil. During the movement of the magnets, they are not kept fully immersed in the magnetic field generated. In this situation, the portions not immersed in the magnetic field cause losses which affect the overall efficiency of the sound transducer.

SUMMARY OF THE CLAIMED INVENTION

The technical purpose of the invention is therefore to provide a sound diffuser and a method for diffusing a sound through a sound diffuser which are able to overcome the drawbacks of the prior art.

The aim of the invention is therefore to provide a sound diffuser having a transducer which allows high mechanical movements of the sound membrane of the diffuser associated with it to be generated without increasing its overall dimensions, especially the dimensions in the movement direction of the magnets.

A further aim of the invention is to provide a sound diffuser having a transducer which is able to generate high forces and movements with a low energy consumption.

A further aim of the invention is to provide a method diffusing a sound through a sound diffuser which is simple and efficient.

The technical purpose indicated and the aims specified are substantially achieved by a sound diffuser and a method for diffusing a sound through a sound diffuser comprising the technical features described in one or more of the appended claims. The dependent claims correspond to possible embodiments of the invention.

In particular, the technical purpose indicated and the aims specified are achieved by a transducer for sound diffuser.

Preferably, but not necessarily, the transducer is used in the context of sound diffusers for reproducing sound.

The transducer according to the invention could also be used in the so-called bass boards.

Alternatively, the transducer is suitable for use in systems for active control of noise and vibrations for helicopters and similar vehicles.

Alternatively, the transducer is used in active vibrations dampers for vehicles, for example trucks and the like, and/or inside vehicle suspensions. The transducer may also be used for destructive vibration tests and/or in material testing equipment (for example, traction/compression testing machines).

The transducer could also be used in vibrating conveyors.

The transducer could also be used in energy collection systems.

The transducer comprises a coil including a plurality of turns each lying in a respective plane transversal to a longitudinal axis. The turns are juxtaposed along the longitudinal axis. In particular, the turns of the coil can surround the longitudinal axis.

The transducer also comprises a ferromagnetic circuit including a core, provided with a central portion around which the coil is wound, and an outer lateral portion located at the side of the coil and at least partly surrounding the coil.

The outer lateral portion is separated from the core by an air gap, that is to say, by air. The air gap is extended longitudinally.

The transducer also comprises at least one magnet located inside the air gap. The magnet is a permanent magnet, that is to say, a magnetized body which is able to create its own magnetic field.

According to an aspect of the invention, the magnet has a first end and a second end. In this situation, the magnet has a south pole and a north pole extending between the first end and the second end parallel to the longitudinal axis.

In other words, the magnet has two opposite faces having opposite polarization.

The magnet is movable, inside the air gap, along a movement direction parallel to the longitudinal axis.

In more detail, the movement of the magnet along the movement direction is induced by a magnetic energizing field generated by energizing the coil, that is to say, by the passage of an electric current inside the coil.

An example of a transducer is disclosed by patent document US2015256911A1, wherein there is a pair of coils, each wound around a core portion; the two core portions are placed side by side so as to define an air gap within which a movable magnet is placed. Therefore, the coils are placed side by side and each of the two core portions defines, for the other core portion, an outer lateral portion which, in fact, is located at the side of one of the two coils and cooperates with the other core portion to define the air gap.

Conversely, according to the present invention, the transducer has only one coil; the coil is wound around a core portion (in particular, around the central portion) and the outer side portion, with which the core cooperates to define the air gap, is not surrounded by further coils, as it is instead in US2015256911A1.

A further difference is that the turns of the coil are wound around the longitudinal axis; therefore, when the transducer is used in an acoustic diffuser which includes a radiator, movable with reciprocating motion along the longitudinal axis, the coil is aligned with the longitudinal axis, i.e. with the axis along which the radiator oscillates.

According to one example, the coil is a single coil. Preferably, the central portion extends along the longitudinal axis.

The ferromagnetic circuit might also comprise an inner lateral portion located at the side of the coil and interposed between the coil and the at least one magnet.

The inner lateral portion has a high magnetic permeability zone close to (or facing) the coil.

According to a possible embodiment, the high magnetic permeability zone is defined by a slot transversal to the longitudinal axis such as to divide the inner lateral portion into an upper sub-portion and a lower sub-portion juxtaposed along a direction parallel to the longitudinal axis and defining respective pole expansions directed towards the air gap.

According to a possible embodiment, the upper sub-portion and the lower sub-portion of the inner lateral portion (and thus the inner lateral portion) are made in one piece with the core and jut out relative to the central portion towards the outer lateral portion winding around the coil.

In other words, the upper sub-portion and the lower sub-portion extend in such a way as to wind almost entirely around the coil leaving free only the area close to the slot in such a way that the coil can face, in that zone, towards the air gap and the magnet.

According to one embodiment, the core extends along the longitudinal axis, to define the central portion. In other words, the central portion extends along the longitudinal axis. The core may protrude transversely with respect to the longitudinal axis and away from the longitudinal axis, to define an upper protrusion zone and a lower protrusion zone. In particular, the upper protrusion zone comprises the upper sub-portion and the lower protrusion zone comprises the lower sub-portion. Preferably, the upper protrusion zone and the lower protrusion zone are located symmetrically with respect to an axis transversal to the longitudinal axis and passing through a center of the coil. In other words, the protrusion zones surrounds the coil at the bottom and at the top symmetrically with respect to a plane transverse to the longitudinal axis and passing through a center of the coil, i.e. the upper protrusion zone and the lower protrusion zone have the same extension symmetrically to a plane transverse to the longitudinal axis and passing through a center of the coil.

According to a possible architecture of the transducer, and in particular according to a radial architecture, the coil has a substantially circular shape. In this situation, the outer lateral portion has an annular shape forming an outer ring surrounding the coil. The outer ring is concentric with the coil and forms with the latter a circular crown defining the air gap "T".

According to this embodiment, the magnet also has an annular shape and defines a magnetic ring entirely surrounding the coil. The magnetic ring is positioned inside the air gap "T" in such a way that one between the north pole and the south pole is entirely facing towards the coil for the entire circular extension of the coil, whilst the other pole faces towards the outer lateral wall.

Like the outer lateral wall, the inner lateral wall also has an annular shape and defines an inner ring surrounding the coil. The inner ring is interposed between the coil and the magnetic ring. In this situation, the coil is entirely embedded into the ferromagnetic circuit and only faces the air gap for the part left free by the slot.

The radial architecture of the transducer is particularly advantageous since it allows the efficiency of the transducer to be increased while keeping its dimensions compact.

In one embodiment, the coil comprises a plurality of rectilinear portions, transverse to the longitudinal axis. The outer lateral portion may comprise a plurality of parts surrounding the coil. The plurality of parts may cooperate with the corresponding plurality of rectilinear portions to define a plurality of air gaps. The diffuser, or the transducer, can comprise a plurality of magnets; each magnet of the plurality of magnets may be located in a respective air gap of the plurality of air gaps. In particular, each magnet may be located between a part of the plurality of parts of the outer lateral portion and a rectilinear portion of the plurality of rectilinear portions of the coil.

Preferably, in a cross-sectional plane to the longitudinal axis, the magnets of the plurality of magnets are arranged as the sides of a regular polygon. In particular, the regular polygon is inscribed in a circle having a center passing through the longitudinal axis.

According to another possible architecture of the transducer, the coil has an elongate shape along a main direction of extension transversal to the longitudinal axis.

According to this embodiment, the coil comprises a first rectilinear portion parallel to the main direction of extension and a second rectilinear portion opposite the first rectilinear portion and parallel to the main direction of extension.

The first and second rectilinear portions are joined together by respective connecting portions which are rounded (that is, curved connection sections) and transversal to the main direction of extension.

According to this embodiment, the outer lateral portion comprises a first and a second part which are separate from each other and located to the side of the coil symmetrically relative to the longitudinal axis.

The first and second parts of the outer lateral portion are substantially in the shape of a parallelepiped and extend parallel to the main direction of extension.

The first and second parts of the outer lateral portion face, respectively, the first rectilinear portion and the second rectilinear portion of the coil. The first and second parts of the outer lateral portion are spaced from the first rectilinear portion and the second rectilinear portion of the coil of the air gap. According to the preferred embodiment, the first and second parts of the outer lateral portion have, along the main direction of extension, substantially the same extension as the first rectilinear portion and the second rectilinear portion of the coil.

According to this embodiment, the transducer also comprises a further magnet located inside the air gap symmetrically to the magnet relative to the longitudinal axis. The further magnet is a permanent magnet.

Throughout the present description, the further magnet can also be indicated with the term "second magnet", as well as the magnet that can also be indicated with the term "first magnet".

One between the magnet and the further magnet is interposed between the first rectilinear portion of the coil and the first part of the outer lateral portion whilst the other is interposed between the second rectilinear portion of the coil and the second part of the outer lateral portion.

The further magnet is movable along a movement direction parallel to the longitudinal axis.

According to an aspect of the embodiment, the magnet and the further magnet are respectively facing the first and second rectilinear portions and have an elongate shape extending along respective axial directions parallel to the main direction of extension.

According to a further aspect, the first rectilinear portion and the magnet have the same axial extension as the second rectilinear portion and the further magnet have the same axial extension.

In use, when the coil is energized by the current to generate the magnetic energizing field, both the magnet and the further magnet are moved, within the air gap, along the respective movement directions. In particular, the magnetic field generated by the magnet and by the further magnet is disturbed by the magnetic energizing field in such a way that the magnet and the further magnet move (raising and lowering) along the respective movement directions. This motion of the magnet and of the further magnet causes an oscillation of the radiator of the diffuser to which the transducer is operatively connected.

So that the magnet and the further magnet move simultaneously along the respective movement directions, the transducer comprises a supporting body operatively connected to the magnet and to the further magnet to make the movement of the magnet and the further magnet integral along the respective movement directions when the coil is energized.

According to an aspect of the invention, the supporting body has a closed shape and elongate along the main direction of extension in such a way as to define, symmetrically relative to the longitudinal axis, housing seats for the magnet and the further magnet.

According to an aspect of the invention, the transducer also comprises a retaining band, preferably made of metal, configured to prevent a movement of the supporting body transversely to the longitudinal axis.

In other words, the retaining band is configured for constraining the supporting body to translate along a direction parallel to the longitudinal axis following a movement of the at least one magnet.

According to an aspect of the invention, the retaining band is elastically deformable in such a way that a movement of the supporting body corresponds to a bending of the retaining band.

Advantageously, the retaining band allows the movement of the magnets along the respective movement directions and, at the same time, prevents unwanted movement along different directions.

Advantageously, the retaining band also guarantees compactness and seal of the entire transducer.

According to one example, the plurality of rectilinear portions comprises a first, a second, a third and a fourth rectilinear portion. The plurality of rectilinear portions, in particular the first, second, third and fourth rectilinear portions, can be joined together by respective curved connection sections. In one example, the first and second rectilinear portions may be mutually facing. The third and fourth rectilinear portions may be mutually facing. Preferably, the first, second, third and fourth rectilinear portions lie on a same plane transverse to the longitudinal axis.

The plurality of parts of the outer lateral portion may include a first, a second, a third and a fourth part. The first, the second, the third and the fourth part can be separate from each other and can be placed laterally to the coil symmetrically with respect to the longitudinal axis.

The plurality of magnets may include a first magnet, a second magnet, a third magnet and a fourth magnet.

Preferably, the first magnet is placed between the first rectilinear portion and the first part of the outer side portion; the second magnet is placed between the second rectilinear portion and the second part; the third magnet is placed between the third rectilinear portion and the third part; the fourth magnet is placed between the fourth rectilinear portion and the fourth part.

The first, second, third and fourth magnets are movable along respective movement directions, parallel to the longitudinal axis.

According to an embodiment, each magnet (i.e. the first, the second, the third magnet and the fourth magnet) extends along a direction transversal to the longitudinal axis and parallel to the respective rectilinear portion.

In one embodiment, the magnets of the plurality of magnets are joined together by respective angular elements. Preferably, the angular elements are arranged in correspondence with the curved connection sections of the coil, so to form a rigid structure movable along the longitudinal direction.

According to an example, the first rectilinear portion and the first magnet have the same transversal extension to the longitudinal axis, as well as the second rectilinear portion and the second magnet, the third rectilinear portion and the third magnet and the fourth rectilinear portion and the fourth magnet.

According to one embodiment, the sound diffuser comprises a guide device, in particular four guide devices. Each guide device can be coupled to an angular element of the plurality of angular elements, to allow the movement of each magnet of the plurality of magnets along the respective movement direction.

It is observed that the guide device can be a single guide device.

Each guide device is configured to constrain the movement of the magnets along the movement direction, while preventing a movement in a direction transversal to the longitudinal axis.

As far as the guide device is concerned, this can be made according to what is described in the patent document IT102022000026061 by the same applicant, enclosed here by reference.

It should be noted that the term “coupled” means, for example, that an external surface of the guide device can coincide with the angular element, or that the angular element defines an external surface of the guide device, or that the angular element is connected to a bush which defines an external surface of the guide device.

Each guide device comprises an internal surface extending around guide axis longitudinally oriented. Each guide device comprises an external surface, extending around the guide axis and surrounding the internal surface to define a cavity. Each guide device may include a plurality of ball bearings, arranged in the cavity, in contact with the internal surface and the external surface to roll on them moving longitudinally in response to a relative movement between the internal surface and the external surface. Preferably, each guide device comprises an elastic element, for example a spring, closed on itself to form a ring, arranged in the cavity in contact with the internal surface and the external surface, to roll on them moving longitudinally in response to a relative movement between the internal surface and the external surface.

The internal surface can be connected (directly or indirectly) to the core and the external surface can be connected (directly or indirectly) to a magnet, i.e. at least one magnet, or vice versa.

Preferably, the outer surface is connected to a pair of magnets of the plurality of magnets and the inner surface is connected to the core, or vice versa.

It is observed that it is also possible that the internal surface and the external surface develop according to various shapes along the longitudinal direction (for example, they can develop along respective planes parallel to the longitudinal axis). Therefore, the elastic element can be inserted within the cavity formed by the internal surface and the external surface, so as to roll between the surfaces longitudinally. In this case, the elastic element may not be closed on itself to form a ring.

According to an example, the guide device comprises a retaining band, preferably metallic, which can be made according to one or more aspects of the present description. The retaining band is configured to constrain the movement of the magnets along the direction of movement and to prevent a movement along a direction transverse to the direction of movement. The retaining band can be connected to the angular elements. The retaining band may comprise first, second, third and fourth sections defining a plurality of sections of the retaining band. A pair of sections of the plurality of sections of the retaining band can be connected, at one end of thereof, to an angular element. Each section of the plurality of sections of the retaining band can be connected, in a central region thereof, preferably jointly, to a corresponding part of the plurality of parts of the outer lateral portion, for example via a connecting element. Each section is elastically deformable, so that a movement of an angular element corresponds to a bending of the sections of the retaining band to which the angular element is connected.

In one possible embodiment, each magnet of the plurality of magnets has a first end and a second end. The first end is opposite the second end in the longitudinal direction. Each magnet includes a south pole and a north pole. Preferably, each north pole and each south pole extend between the first end and the second end parallel to the longitudinal axis.

In other words, each magnet has a first side and a second side, opposite to the first side. The first side and the second side extend longitudinally, i.e., along a direction parallel to the longitudinal axis. In this case, each magnet comprises a south pole, located on one between the first and the second side of the magnet, and a north pole, located on the other between the first and the second side of the magnet.

Preferably, the first magnet and the second magnet have the same pole facing the coil. When present, the third magnet and the fourth magnet have the same pole facing the coil.

Therefore, the embodiment having the first, second, third and fourth magnet most closely approximate a radial configuration. This allows, for the same forces developed by the loudspeaker, more contained mobile masses (i.e. masses of the magnets) and allows to obtain more extended passbands in frequency, in particular towards the high frequencies.

According to one example, the sound diffuser, i.e. the transducer, comprises a thermally conductive resin matrix, which incorporates the coil and at least part of the core.

In an example, the core is made by a sintered magnetic composite, SMC. The sintered magnetic composite is characterized by a high induction and high permeability; also, it reduces the losses due to parasitic currents and it reduces the material hysteresis.

The technical purpose and aims of the invention are also achieved by a method for making a transducer for a sound diffuser.

The method comprises a step of preparing a transducer comprising a coil provided with a plurality of turns each extending on a respective plane transversal to a longitudinal axis. The turns are juxtaposed along the longitudinal axis. The transducer also comprises a ferromagnetic circuit comprising a core provided with a central portion around which the coil is wound and an outer lateral portion located at the side of the coil and separated from the coil by an air gap. The transducer also comprises at least one magnetizable element.

According to a possible embodiment, the transducer comprises a pair of elements which can be magnetized opposite each other and symmetrical relative to the longitudinal axis.

The method also comprises a step of positioning the at least one magnetizable element inside the air gap and a step of preparing, outside the transducer, an auxiliary magnetizing circuit configured for magnetizing the magnetizable element.

The method then comprises a step of magnetizing the at least one magnetizable element by activating the auxiliary magnetizing circuit in such a way as to make a permanent magnet (or if there is the further magnetizable element, a further permanent magnet).

Advantageously, the possibility of magnetizing the magnetizable element once inside the transducer makes it possible to facilitate the assembly of the transducer.

The present description also provides a method for diffusing a sound through a sound diffuser. The method comprises a step for preparing a transducer comprising a coil having a plurality of turns each extending on a respective plane transverse to a longitudinal axis, the turns being juxtaposed along the longitudinal axis. The transducer comprises a ferromagnetic circuit comprising a core provided with a central portion around which the coil is wound, an outer lateral portion located at the side of the coil and separated from the coil by an air gap, and at least one magnetizable element.

The method comprises a step of positioning the magnetizable element within the air gap. The method provides for a phase of preparation, on the outside of the transducer, of an auxiliary magnetization circuit configured to magnetize the magnetizable element. The method comprises a magnetization step of the magnetizable element located in the air gap, by activating the magnetization auxiliary circuit in order to make a permanent magnet.

According to an example, the turns of the coil surround the longitudinal axis and the coil comprises a plurality of rectilinear portions transverse to the longitudinal axis, including a first, a second, a third and a fourth rectilinear portion, joined together by curved connection sections, wherein the first and second straight portions are mutually facing and the third and fourth portions are mutually facing. The outer lateral portion may comprise a plurality of parts surrounding the coil, cooperating with the corresponding plurality of rectilinear portions to define a plurality of air gaps, wherein the plurality of parts of the outer lateral portion comprises first, second, third and fourth part.

According to an example, the method comprises a magnetization step of the magnetizable element, by activating the auxiliary magnetization circuit in order to create a plurality of permanent magnets. Each magnet is placed in a respective air gap of the plurality of air gaps, the plurality of magnets comprising first, second, third and fourth magnets movable along respective movement directions, parallel to the longitudinal axis.

In a possible embodiment, the method comprises a step of providing angular elements in correspondence with the curved connection sections of the coil to join the magnets of the plurality of magnets together. The method can comprise a step of providing four guide devices, each of which being coupled to an angular element of a plurality of angular elements. The method can comprise a step of guiding, by the guide devices, the plurality of magnets along the respective movement direction.

Each guide device can be made according to one or more aspects of the present description.

According to an embodiment, the method provides a step of providing a mechanical transmission, including an actuating member (or a plurality of actuating members) operatively interposed between the magnet (or between the plurality of magnets) and a radiator of the sound diffuser and a phase of transmission of the movement of the magnet (or the plurality of magnets) to the radiator through the mechanical transmission.

The invention also relates to a sound diffuser comprising a housing.

According to a possible embodiment, the diffuser may also comprise a case. The sound diffuser also comprises a transducer located inside the housing and comprising a coil and at least one magnet, in particular a permanent magnet, movable with reciprocating motion along a movement direction under the action of a magnetic field generated by the coil.

The sound diffuser also comprises a radiant structure including a suspension connected to the housing and a radiator connected to the suspension.

The suspension is configured to allow the radiator to oscillate relative to the housing.

In particular, the suspension allows the radiator to move with reciprocating motion along a longitudinal axis parallel to the movement direction of the at least one magnet.

In this situation, the radiator is operatively coupled to the at least one magnet in such a way that a movement of the magnet along the movement direction parallel to the longitudinal axis corresponds to an oscillation, and in particular an oscillation in the opposite direction, of the radiator along the longitudinal axis.

Advantageously, since the mass of the transducer is comparable with the mass of the sound coupling systems of the sound diffuser, it is convenient to reverse the motion of the at least one magnet relative to that of the radiator to allow the masses to be opposed in an inertial manner in such a way that the sound diffuser is balanced, minimizing the mechanical vibrations produced during the operation.

According to an example, the sound diffuser comprises a mechanical transmission, including at least one actuating member interposed between the at least one magnet and the radiator, preferably for moving the radiator in the opposite direction with respect to the at least one magnet, or for moving the radiator in the same direction with respect to the at least one magnet.

The mechanical transmission, in particular the actuating member, constitutes a homokinetic inverter. The amplitude of the movement of the radiator and the amplitude of the movement of the magnet can be the same or different; in other words, the transmission ratio can be unitary or non-unitary.

For example, the mechanical transmission may include a plurality of actuating members for moving the radiator in the opposite direction with respect to the plurality of magnets, or for moving the radiator in the same direction with respect to the plurality of magnets.

The plurality of actuating members can comprise a first actuating member, for moving the radiator with respect to the first magnet, a second actuating member, for moving the radiator with respect to the second magnet, a third actuating member for moving the radiator with respect to the third magnet and a fourth actuating member for moving the radiator relative to the fourth actuating member.

Therefore, the system of inverters, i.e. the mechanical transmission is perimetrical, allowing for a better distribution of the forces that couple the radiator to the magnet; this facilitates the pressure tolerance of the radiator itself, allowing for a lighter and more economical construction. According to an example, the actuating member, or the plurality of actuating members, can constitute a guide device, that is, the actuating member can be configured to constrain, or guide, the movement of the magnet or of the plurality of magnets along the movement direction preventing movement in a direction transverse to the direction of movement.

Further features and advantages of the invention are more apparent in the non-limiting description which follows of a non-exclusive embodiment of a transducer for sound diffuser, a sound diffuser and a method for making the transducer.

BRIEF DESCRIPTION OF THE DRAWING FIGURES

The description is set out below with reference to the accompanying drawings which are provided solely for purposes of illustration without restricting the scope of the invention and in which:

FIGS. 10A, 10B and 10C are a sound diffuser according to one or more aspects of the present invention;

FIG. 11 is a sound diffuser according to one or more aspects of the present invention;

FIGS. 12A-12G are a transducer according to one or more aspects of the present invention;

Figure 1:
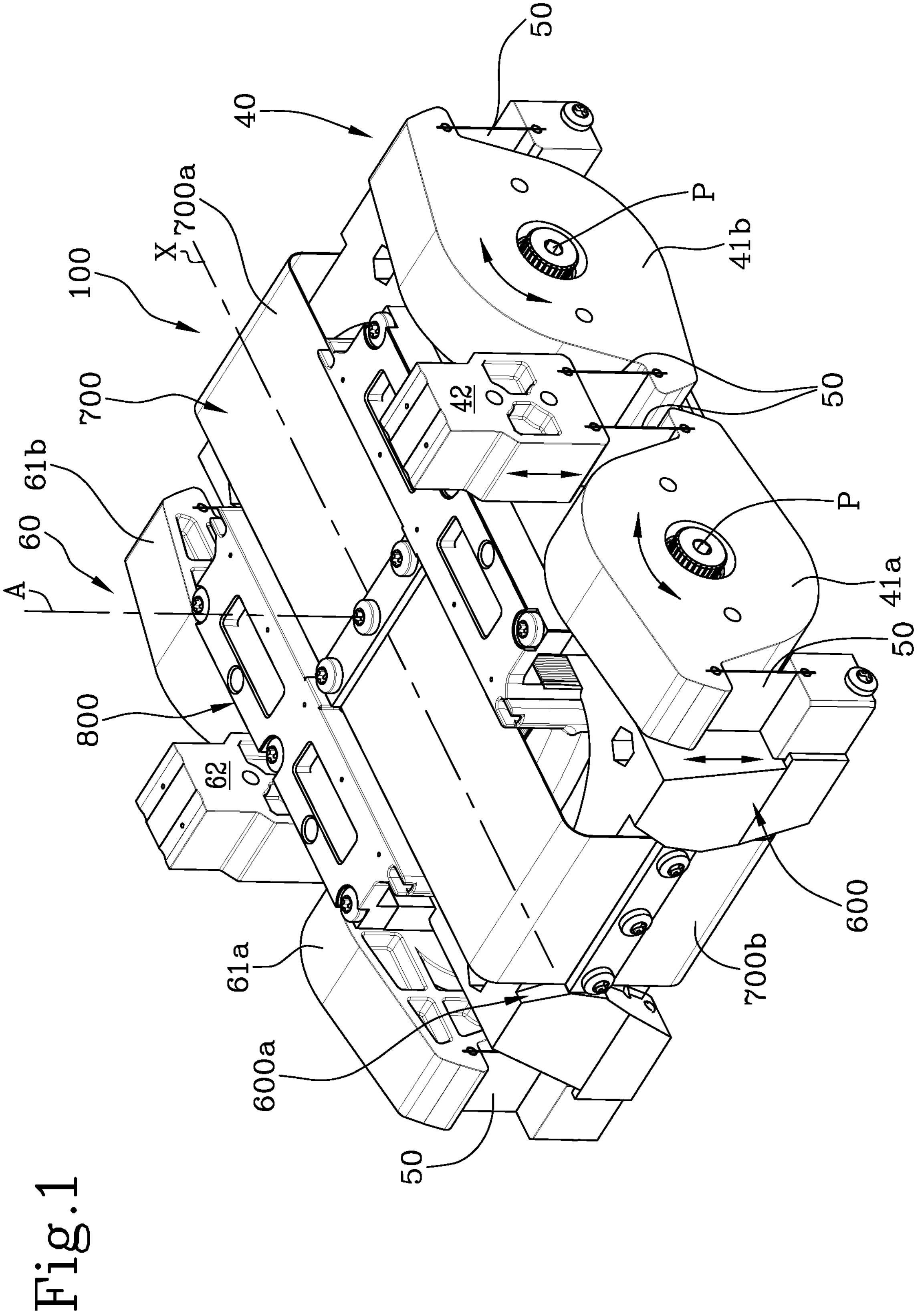
FIG. 1 is a perspective view of a transducer.

FIG. 13A schematically illustrates a section of a transducer along a plane of symmetry passing through the longitudinal axis, according to one or more aspects of the present invention;

FIG. 13B illustrates a transducer according to one or more aspects of the present invention in section along line B of FIG. 12B;

FIGS. 14A-14D show a transducer according to one or more aspects of the present invention.

DETAILED DESCRIPTION OF EMBODIMENTS

With reference to the accompanying drawings, the numeral 100 denotes a transducer for a sound diffuser "C".

The transducer 100 comprises a coil 200 including a plurality of turns 201 each lying in a respective plane r transversal to a longitudinal axis “A”. The turns 201 are juxtaposed along the longitudinal axis “A”.

In other words, the coil 200 is wound along the direction determined by the longitudinal axis “A” in such a way that its turns 201 are parallel to each other.

The transducer 100 also comprises a ferromagnetic circuit 300 including a core provided with a central portion 300*a* around which the coil 200 is wound.

The ferromagnetic circuit 300 also comprises an outer lateral portion 300*b* located at the side of the coil 200 and at least partly surrounding the coil 200.

Figure 4:
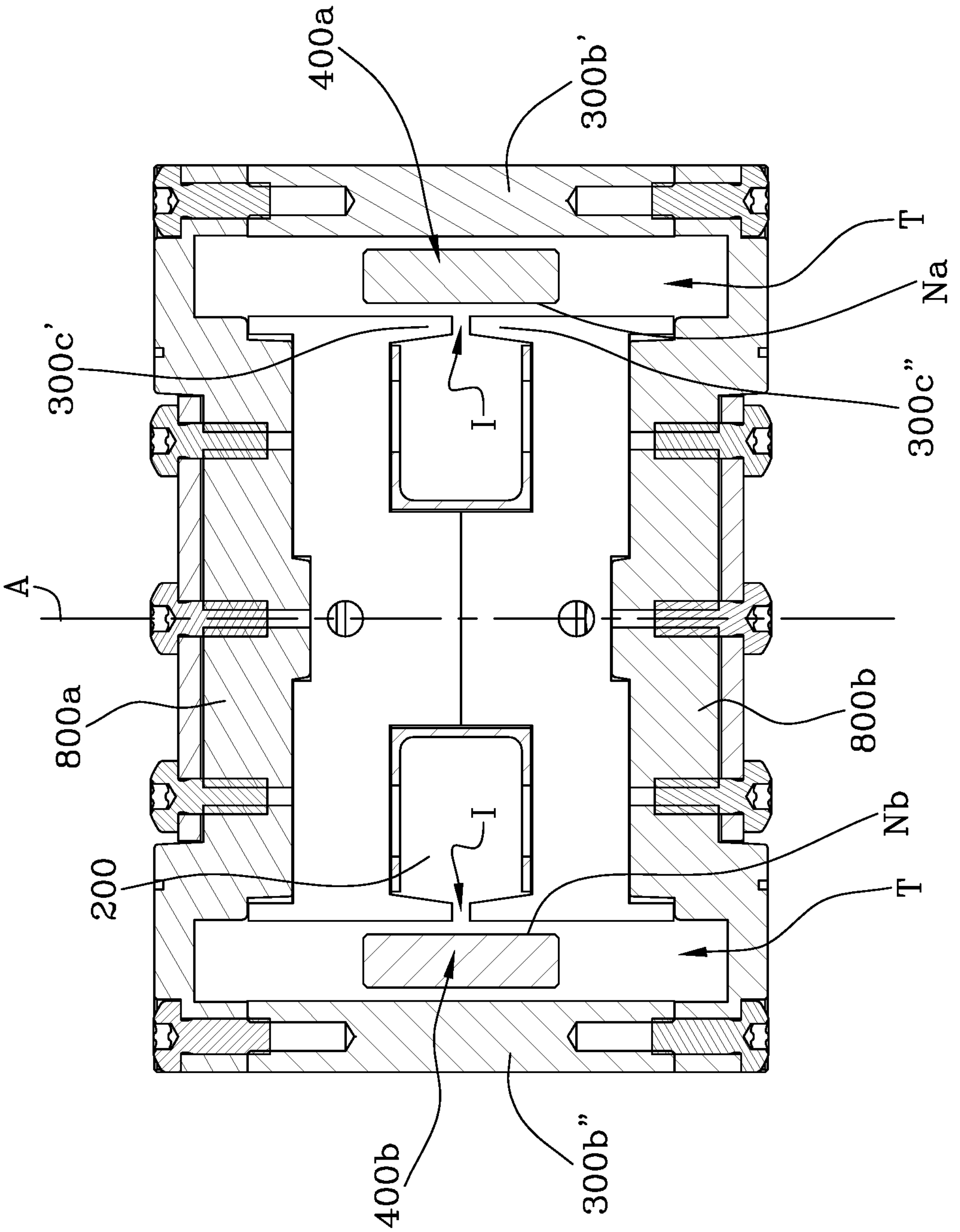
FIG. 4 is a cross-section of the transducer.
Figure 5B:
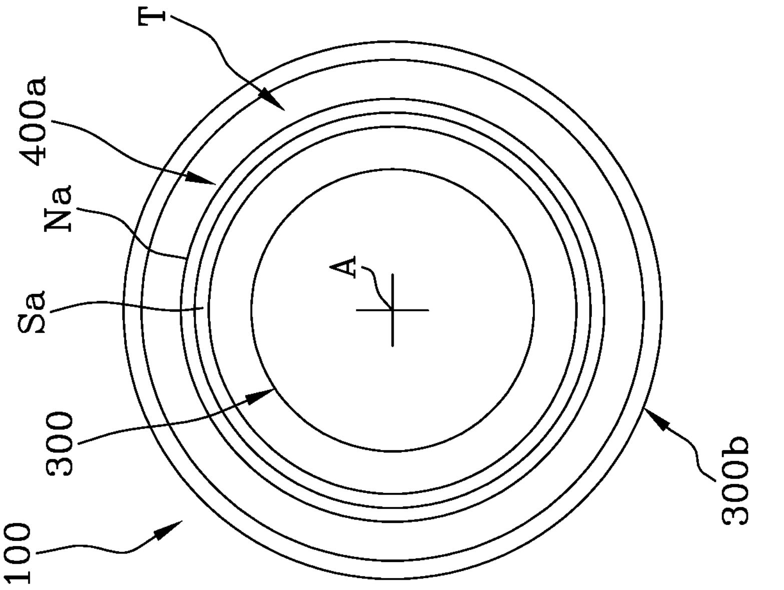
FIGS. 5A and 5B are a cross-section view and a top view of a further embodiment of the transducer.
Figure 5A:
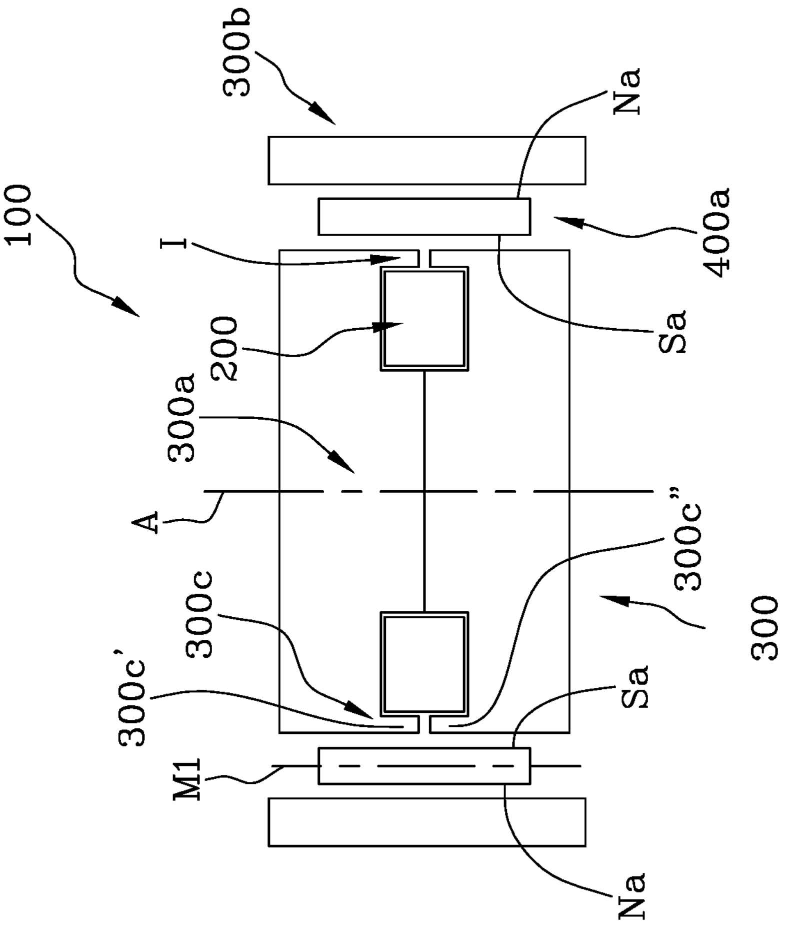

As shown in FIGS. 4 and 5A-5B, the outer lateral portion 300*b* is separated from the core by an air gap “T” that extends longitudinally.

The transducer 100 also comprises at least one magnet 400*a* located inside the air gap “T”. The magnet 400*a* is a permanent magnet, that is to say, a magnetized body which is able to create its own magnetic field.

The magnet 400*a* is movable along a movement direction “M1” parallel to the longitudinal axis “A”.

In more detail, the movement of the magnet 400*a* along the movement direction M1 is induced by a magnetic energizing field generated by energizing (that is to say, by the passage of current inside) the coil 200.

In this situation, when the transducer 100 is mounted in a sound diffuser “C” and the coil 200 is energized by an electric energizing signal, an magnetic energizing field is generated. The magnetic energizing field interacts with the magnetic field of the permanent magnet 400*a* inducing the latter to move along the movement direction “M1”. The movement of the magnet 400*a* causes, in turn, an oscillation or translation of a radiator 30*b* of the sound diffuser “C”, allowing the latter to produce a sound.

According to the preferred embodiment, the magnet 400*a* has a first end 400*a*' and a second end 400*a*".

The magnet 400*a* has a south pole “Sa” and a north pole “Na” extending between the first end 400*a*' and the second end 400*a*" parallel to the longitudinal axis “A”.

Figure 3A:
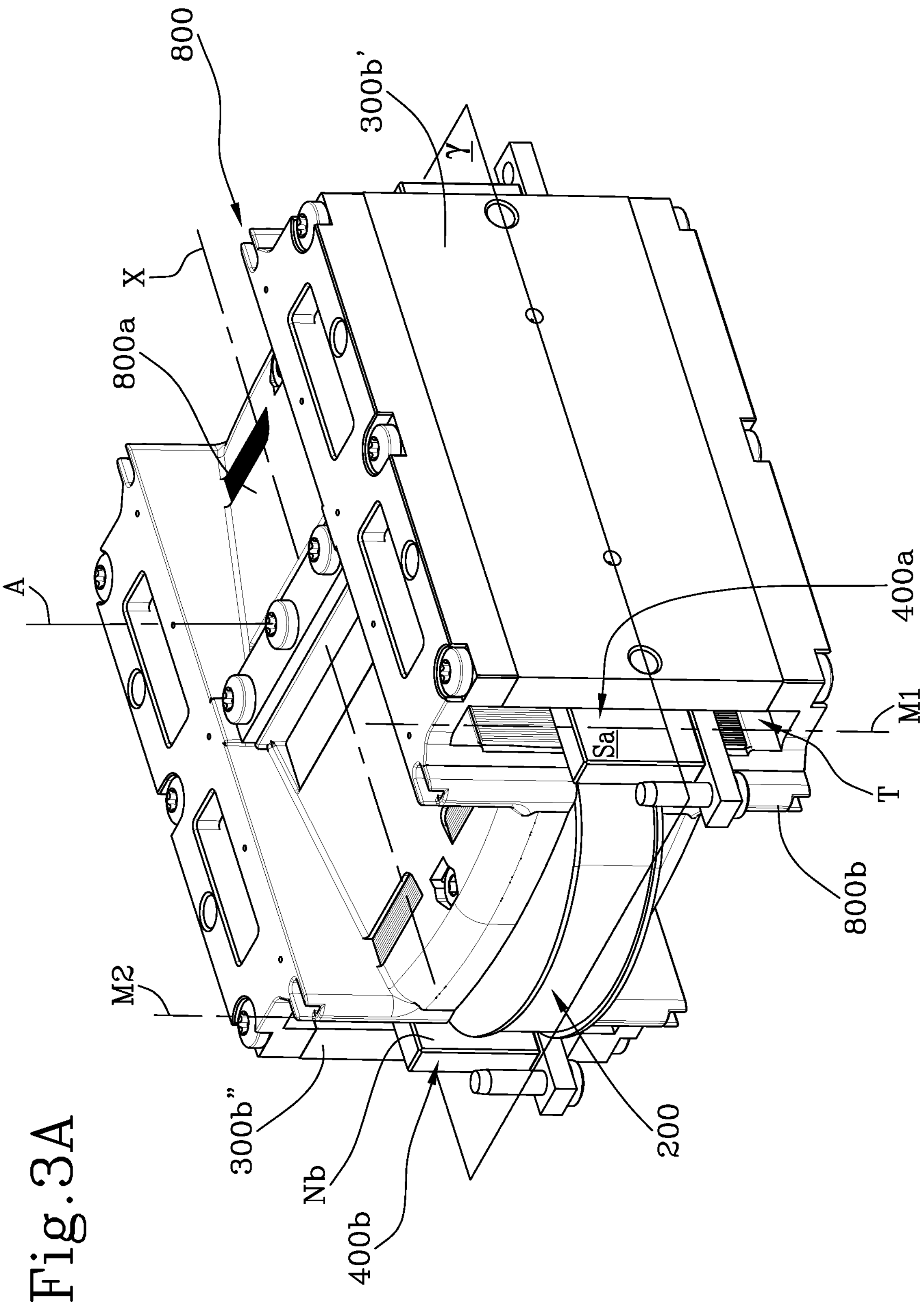
FIGS. 3A, 3B and 3C are perspective views of the inside of the transducer.

As shown in FIG. 3A or 5A, in this situation, the magnet 400*a* substantially has two opposite faces corresponding, respectively, to the south pole “Sa” and the north pole “Na”.

When the magnet 400*a* is positioned in the air gap “T”, one between the south pole “Sa” and the north pole “Na” entirely faces towards the coil 200 whilst the other pole faces the outer lateral wall 300*b*.

According to the invention, the ferromagnetic circuit 300 also comprises an inner lateral portion 300*c* located at the side of the coil 200 and interposed between the coil 200 and the at least one magnet 400*a*.

The inner lateral portion 300*c* has a high magnetic permeability zone close to the coil 200.

This zone allows the field lines of the magnetic field of the magnet 400*a* to have a shape like that shown in FIG. 6B, that is to say, it allows the magnetic field, when the coil 200 is not energized, to close inside the inner lateral portion 300*c* and not inside the core, as described in detail below.

According to a possible embodiment, the high magnetic permeability zone is defined by a slot “I” transversal to the longitudinal axis “A” such as to divide the inner lateral portion 300*c* into an upper sub-portion 300*c*' and a lower sub-portion 300*c*" juxtaposed along a direction parallel to the longitudinal axis “A” and defining respective pole expansions facing towards the air gap “T”.

As shown in the cross-section views of FIGS. 4 and 5A, the upper sub-portion 300*c*' and the lower sub-portion 300*c*" of the inner lateral portion 300*c*' may be made in one piece with the core and jut out relative to the central portion 300*a* towards the outer lateral portion 300*b*. In this situation, the inner lateral portion 300*c* and the central portion 300*a* are shaped in such a way that the ferromagnetic circuit 300 has in cross-section a substantially H-shape.

As shown for example in FIG. 4, the upper sub-portion 300*c*' and the lower sub-portion 300*c*" act in conjunction to wind around almost the entire coil 200 except the point at which the slot “I” is made.

In other words, the coil 200 is embedded into (or covered by) the ferromagnetic circuit 300 except for the portion close to the slot “I” which, on the other hand, faces directly the air gap “T”.

Figure 6A:
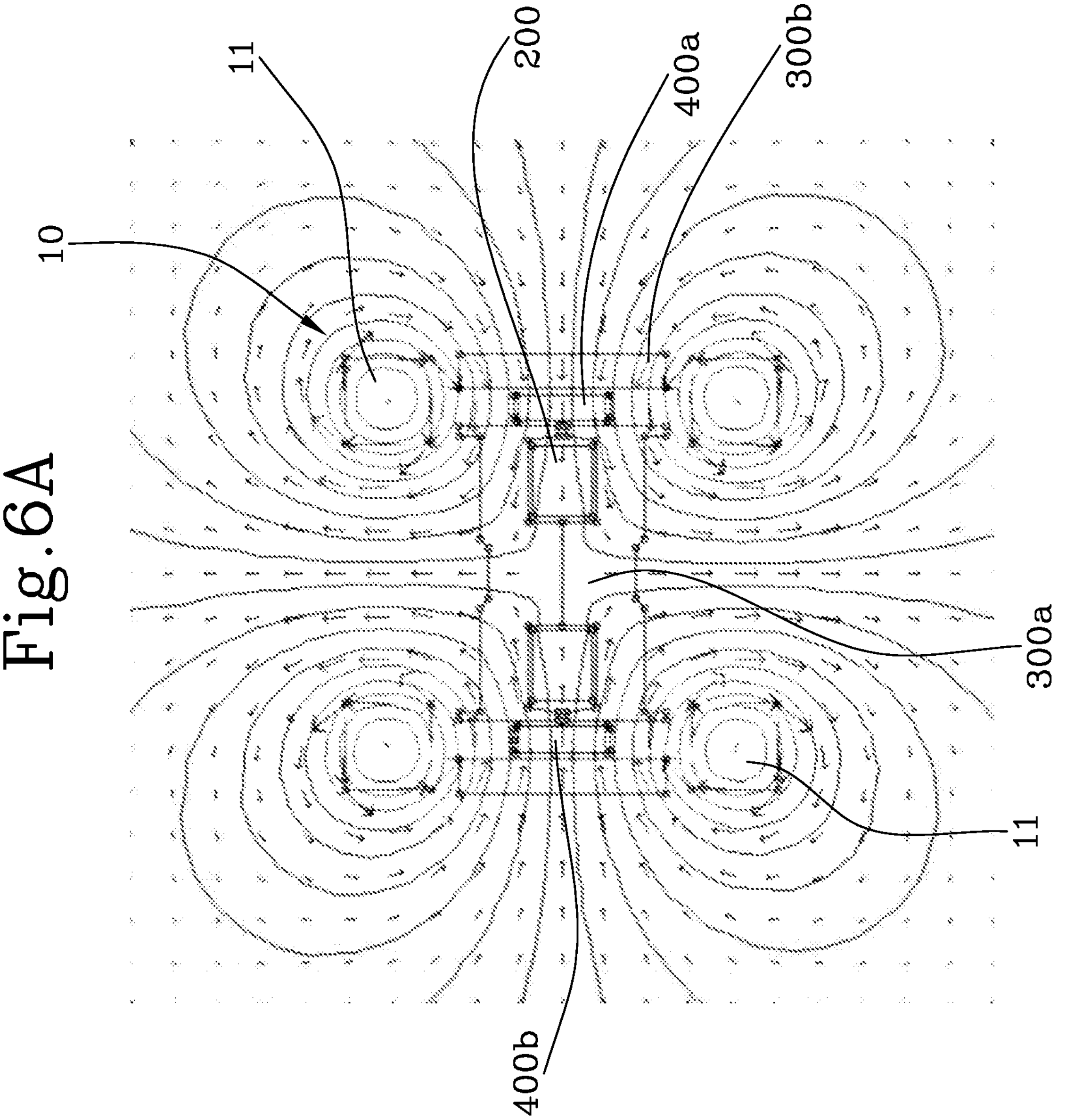
FIGS. 6A and 6B show magnetic field diagrams.
Figure 6B:
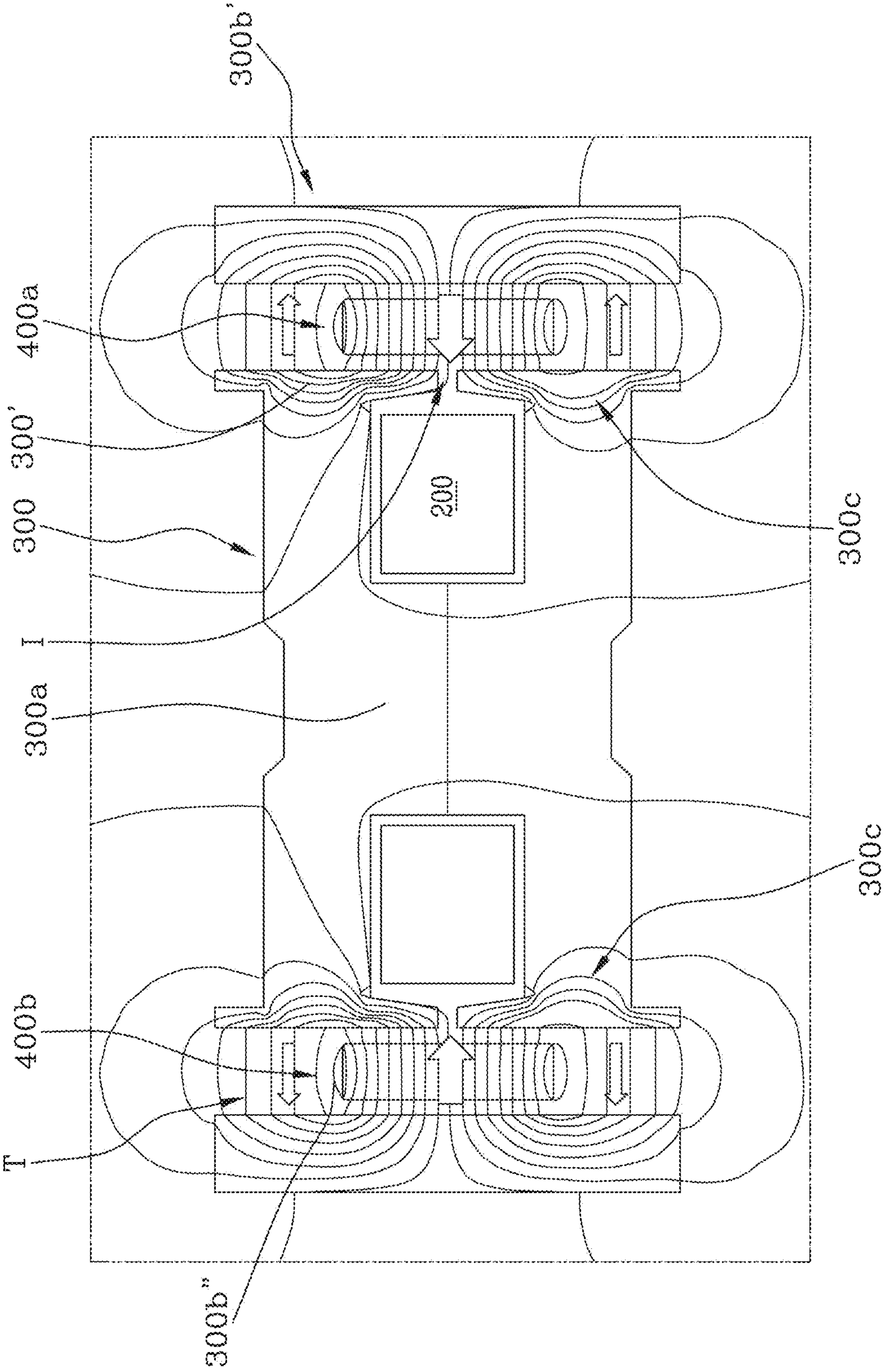

The presence of the slot is particularly advantageous since it creates a zone with low reluctance (or high permeability) such as to allow an extension of the magnetic field as shown in FIG. 6B. In this situation, the at least one magnet 400*a* is in a position of equilibrium inside the air gap “T”, that is to say, in a position in which it substantially fully faces the slot “I”. When a current is made to flow inside the coil 200, it induces the magnetic energizing field which interacting with the magnetic field of the magnet 400*a* induces a movement along the movement direction “M1”.

Figure 3B:
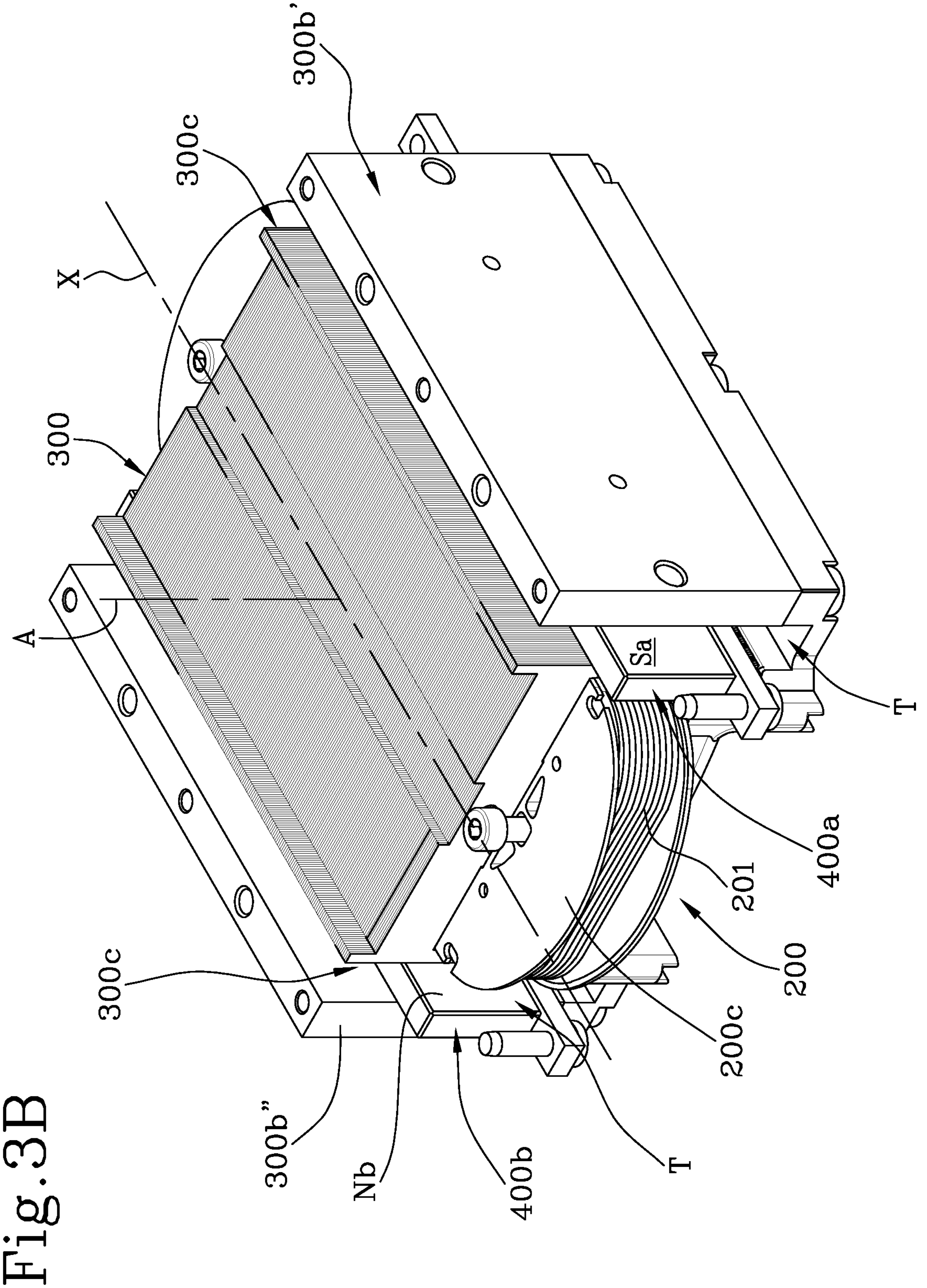

According to the preferred embodiment, the inner lateral portion 300*c* and/or the central portion 300*a* comprise a plurality of plates aligned with each other along a direction transversal to the longitudinal axis “A” (FIG. 3B).

With reference to the embodiments illustrated in the accompanying drawings, FIGS. 5A and 5B show a possible embodiment of the transducer 100 wherein the transducer 100 has a substantially radial extension.

According to this embodiment, the coil 200 is substantially circular in shape and is wound around the central portion 300*a* of the core. In this situation, the outer lateral portion 300*b* has an annular shape forming an outer ring surrounding the coil 200. The outer ring is concentric with the coil 200 and forms with the latter a circular crown defining the air gap “T”.

According to this embodiment, as shown in FIG. 5B, the at least one magnet 400*a* also has an annular shape and defines a magnetic ring entirely surrounding the coil 200. The magnetic ring is positioned inside the air gap “T” in such a way that one between the north pole “Na” and the south pole “Sa” is entirely facing towards the coil 200 for the entire circular extension of the coil 200, whilst the other pole faces towards the outer lateral wall 300*b*.

In other words, as shown in the cross-section of FIG. 5A, the magnetic ring is divided, along a direction parallel to the longitudinal axis “A”, into two parts defining, respectively, the north pole “Na” and the south pole “Sa” of the magnet 400*a* each of which entirely faces one of either the coil 200 or the outer lateral wall 300*b*.

In the example of FIG. 5B, the south pole “Sa” faces the coil 200 whilst the north pole “Na” faces the outer lateral wall 300*b*.

The coil 200, the outer ring and the magnetic ring are concentric and centred relative to the longitudinal axis “A”.

According to this embodiment, the inner lateral portion 300*c* also has an annular shape defining an inner ring concentric with the outer ring. The inner ring is interposed between the coil 200 and the magnetic ring.

In this situation, the slot “I” extends annularly in such a way as to define the upper sub-portion 300*c*' and the lower sub-portion 300*c*".

As shown in FIG. 5A, also in this case, the upper sub-portion 300*c*' and the lower sub-portion 300*c*" project from the central portion 300*a* in such a way as to cover and wind around the coil 200 respectively above and below. The upper sub-portion 300*c*' and the lower sub-portion 300*c*" then move towards each other along a direction parallel to the longitudinal axis "A" for winding at least partly around the faces (or walls) of the coil 200 facing towards the air gap "T".

In use, therefore, when the coil 200 is energized by a current, an magnetic energizing field is generated which interacts with the magnetic field of the magnetic ring causing its movement along the movement direction "M1". This movement causes a movement or oscillation of the radiator 30*b* of the sound diffuser "C" to which the transducer 100 is associated.

Advantageously, the radial architecture of the transducer 100 described above makes it possible to eliminate practically all the losses since the coil 200 is entirely surrounded and wound around by the ferromagnetic circuit 300.

Figure 2:
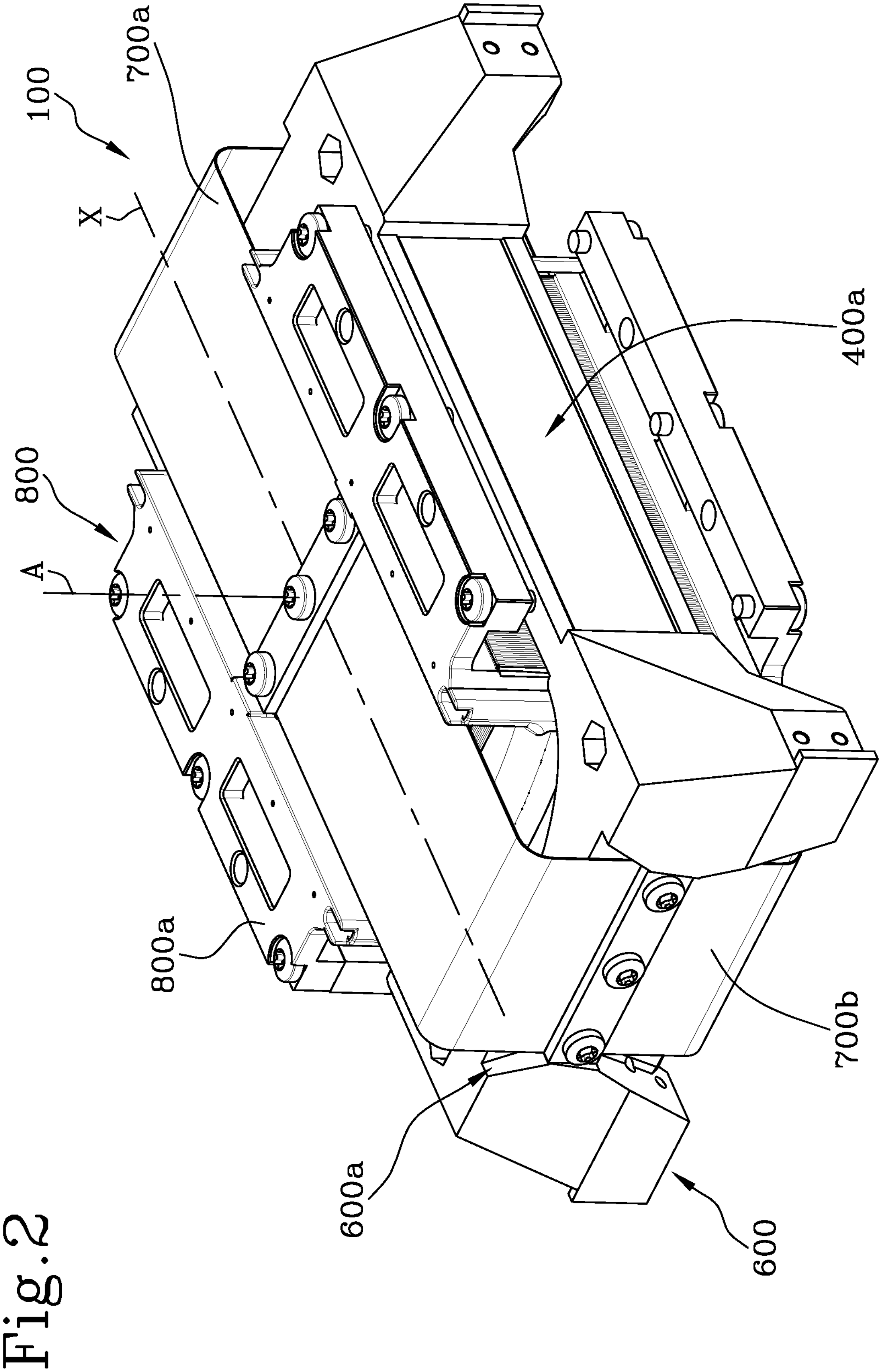
FIG. 2 is a further perspective view of a transducer without the mechanical transmission.

With reference to the embodiment of FIGS. 2-4, the coil 200 has an elongate shape along a main direction of extension "X" transversal to the longitudinal axis "A".

According to this embodiment, the coil 200 comprises a first rectilinear portion 200*a* parallel to the main direction of extension "X" and a second rectilinear portion 200*b* facing the first rectilinear portion 200*a* and parallel to the main direction of extension "X".

Figure 3C:
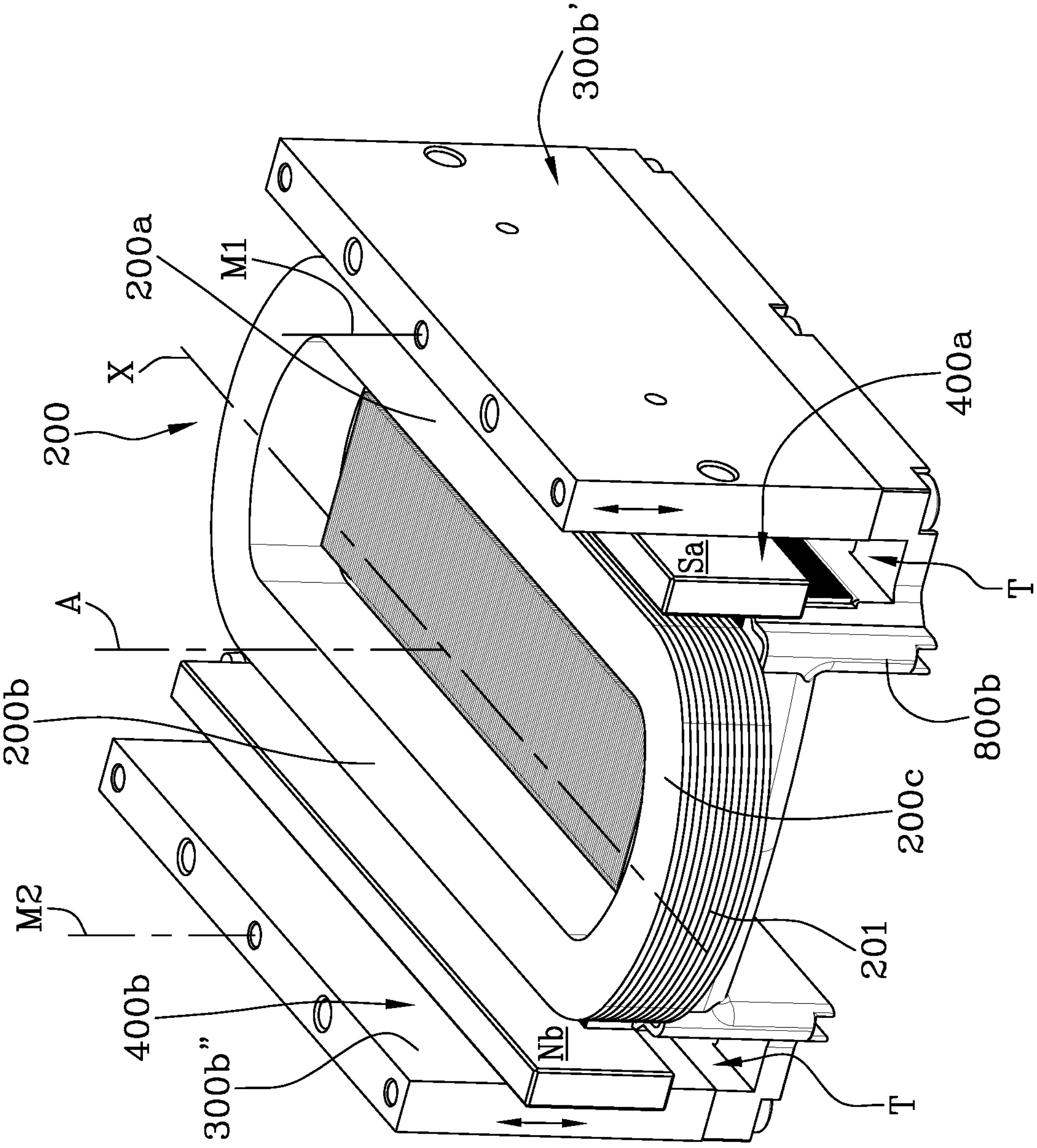

The first and second rectilinear portions 200*a*, 200*b* are joined together by respective connecting portions 200*c* which are rounded and transversal to the main direction of extension "X" (FIG. 3C).

According to this embodiment, the outer lateral portion 300*b* comprises a first and a second part 300*b*', 300*b*'" which are separate from each other and located to the side of the coil 200 symmetrically relative to the longitudinal axis "A".

As shown for example in FIG. 3A-3C, the first and second parts 300*b*', 300*b*" of the outer lateral portion 300*b* face, respectively, the first rectilinear portion 200*a* and the second rectilinear portion 200*b*.

The first and second parts 300*b*', 300*b*" of the outer lateral portion 300*b* are spaced from the first rectilinear portion 200*a* and the second rectilinear portion 200*b* of the coil 200 from the air gap "T".

According to the preferred embodiment, the first and second parts 300*b*', 300*b*" of the outer lateral portion 300*b* have, along the main direction of extension "X", substantially the same extension as the first rectilinear portion 200*a* and the second rectilinear portion 200*b* of the coil 200.

According to this embodiment, the transducer 100 also comprises a further magnet 400*b* located inside the air gap "T" symmetrically to the magnet 400*a* relative to the longitudinal axis "A". The further magnet 400*b* is a permanent magnet.

As shown in FIGS. 3B and 4, one between the magnet 400*a* and the further magnet 400*b* is interposed between the first rectilinear portion 200*a* of the coil 200 and the first part 300*b*' of the outer lateral portion 300*b* whilst the other between the magnet 400*a* and the further magnet 400*b* is interposed between the second rectilinear portion 200*b* of the coil 200 and the second part 300*b*" of the outer lateral portion 300*b*.

The further magnet 400*b* is movable along a movement direction "M2" parallel to the longitudinal axis "A".

More in detail, when the coil 200 is energized to generate the magnetic energizing field, the movement of the further magnet 400*b* along the movement direction "M2" is induced. In this situation, following the energizing of the coil 200, both the magnet 400*a* and the further magnet 400*b* are moved along the respective movement directions "M1", "M2" (parallel to each other) to cause an oscillation of the radiator 30*b* of the sound diffuser "C" in which the transducer 100 is mounted.

According to an aspect of the embodiment, the magnet 400*a* and the further magnet 400*b* respectively face the first and second rectilinear portions 200*a*, 200*b* of the coil 200 and have an elongate shape extending along respective axial directions parallel to the main direction of extension "X".

According to another aspect of the embodiment, the first rectilinear portion 200*a* and the magnet 400*a* have the same axial extension and the second rectilinear portion 200*b* and the further magnet 400*b* have the same axial extension.

More in detail, the coil 200 is symmetrical and therefore the axial extension of the first rectilinear portion 200*a* is equal to that of the second rectilinear portion 200*a* and therefore the axial extension of the magnet 400*a* is equal to that of the further magnet 400*b*.

As shown in FIG. 3B, the magnet 400*a* and the further magnet 400*b* have the same pole "Sa", "Na", "Sb", "Nb" facing the coil 200.

In the above-mentioned drawing, the magnet 400*a* and the further magnet 400*b* both face the north pole "Na", "Nb" to the coil 200. Alternatively, the magnet 400*a* and the further magnet 400*b* could both face the south pole "Sa", "Sb" on the coil 200 and, consequently, the north pole "Na", "Nb" to the first and second parts 300*b*', 300*b*" of the outer lateral portion 300*b*.

According to this embodiment, the central portion 300*a* of the ferromagnetic circuit 300 and the inner lateral portion 300*c* have an elongate shape along the main direction of extension "X". In this situation, the slot "I" is transversal to the longitudinal axis "A" and extends parallel to the main direction of extension "X".

The slot "I" is such as to divide the lateral portion into an upper part 300*c*' and into a lower part 300*c"*.

As shown in 4, according to this embodiment, the first and second rectilinear portions 200*a*, 200*b* of the coil 200 are side by side with the central portion 300*a* of the ferromagnetic circuit 300 and are wrapped at the bottom and top by the upper and lower sub-parts 300*c*', 300*c*" of the inner lateral portion 300*c*.

In this situation, the first and second rectilinear portions 200*a*, 200*b* of the coil 200 are immersed in the ferromagnetic circuit 300 substantially along their entire extension whilst the connecting portions 200*c* protrude from the ferromagnetic circuit 300.

This aspect is particularly advantageous because it minimises losses and increases the efficiency of the transducer 100.

In more detail, since the coil 200 extends almost entirely inside the ferromagnetic circuit 300 it is possible to easily compensate (that is to say, minimize) the losses of efficiency given by the connecting portions 200*c* not immersed in the ferromagnetic circuit 300.

In use, therefore, the magnet 400*a* and the further magnet 400*b* are, if current does not flow in the coil 200, in the equilibrium position, that is to say, they are counter-facing the slot "I" made in the inner lateral portion.

When the coil 200 is energized by a current, a magnetic energizing field is generated inside the ferromagnetic circuit 300 which is able to disrupt the equilibrium of the magnet 400*a* and of the further magnet 400*b*. In particular, the magnetic energizing field interacts with the magnetic fields generated by the magnet 400*a* and by the further magnet 400*b*, causing the latter to move along the respective movement directions "M1", "M2". Consequently, the movement of the magnet 400*a* and the further magnet 400*b* causes an oscillation (or translation) of the radiator 30*b* of the sound diffuser "C" in which the transducer 100 is mounted, allowing the generation of the sound. So that the magnet 400*a* and the further magnet 400*b* move simultaneously along the respective movement directions "M1", "M2", the transducer 100 comprises a supporting body 600 operatively connected to the magnet 400 and to the further magnet 400*b* to make the movement of the magnet 400*a* and of the further magnet 400*b* integral along the respective movement directions "M1", "M2" when the coil 200 is energized.

According to an aspect of the invention, the supporting body 600 has a closed shape and elongate along the main direction of extension "X" in such a way as to define, symmetrically relative to the longitudinal axis "A" housing seats for the magnet 400*a* and the further magnet 400*b* (FIG. 2).

In use, when the coil 200 is energized, the magnet 400*a* and the further magnet 400*b* move simultaneously energized from the magnetic energizing field. Since the magnets 400*a*, 400*b* are connected to the supporting body 600, they drive the latter in a translational motion along the longitudinal axis "A". The supporting body 600 is then moved with reciprocating motion along a direction parallel to the longitudinal axis "A" and thus parallel to the movement directions "M1", "M2" of the magnet 400*a* and of the further magnet 400*b*.

According to an aspect of the invention, the supporting body 600 acts as an upper and lower limit stop for the magnets 400*a*, 400*b* in their lowering and raising movement along the movement directions "M1", "M2".

Advantageously, the supporting body 600 is such that the stroke of the magnets 400*a*, 400*b* along the respective movement directions "M1", "M2" is such that the magnets 400*a*, 400*b* always remain immersed in the magnetic field generated by the energizing of the coil 200.

In other words, during their movement, that is to say, in the configuration of use, the magnets 400*a*, 400*b* always remain immersed in the magnetic energizing field.

According to an aspect of the invention, the transducer 100 comprises a containment shell 800 comprising two half-shells 800*a*, 800*b* juxtaposed relative to each other along the longitudinal axis "A" and such as to form a containment space (FIG. 3A).

Preferably, the half-shells 800*a*, 800*b* have a "U" shape and are each provided with two flanges designed to engage the outer lateral portion 300*b* of the ferromagnetic circuit 300.

In more detail, for example as shown in the embodiment of FIG. 3A, the containment space is delimited below and above by the two half-shells 800*a*, 800*b* whilst it is laterally delimited by the outer lateral portion 300*b* of the ferromagnetic circuit 300.

The coil 200 is integral with the half-shells 800*a*, 800*b* and fixed to them in such a way as to keep a fixed position inside the containment space.

As shown in FIG. 1, the supporting body 600 is inserted in the containment space for the parts engaged with the magnet 400*a* and the further magnet 400*b* whilst it is outside the containment space for the remaining parts.

According to an aspect of the invention, the transducer 100 also comprises a retaining band 700, preferably made of metal, configured to prevent a movement of the supporting body 600 transversely to the longitudinal axis "A".

In other words, the retaining band 700 is configured for constraining the supporting body 600 to translate along a direction parallel to the longitudinal axis "A" following a movement of the at least one magnet 400*a*.

According to an aspect of the invention, the retaining band 700 is elastically deformable in such a way that a movement of the supporting body 600 corresponds to a bending of the retaining band 700, as described in detail below.

As shown in FIG. 1 or 2, the retaining band 700 surrounds the transducer 100 extending parallel to the main direction of extension "X" and surrounding the transducer 100 entirely.

In this situation, the supporting body 600 has a first and a second housing seat 600*a*, 600*b* (not visible) made on ends of the supporting body 600 opposite each other along the main direction of extension "X" and configured to stably receive the retaining band 700.

According to the preferred embodiment, the retaining band 700 has a first portion 700*a* extending parallel to the main direction of extension "X" along the first half-shell 800*a* between the first and second housing seats 600*a*, 600*b*. The retaining band 700 also has a second portion 700*b* extending parallel to the main direction of extension "X" along the second half-shell 800*b* between the first and the second housing seats 600*a*, 600*b*.

The first and second portions 700*a*, 700*b* of the retaining band 700 are pivoted to the first and second housing seats 600*a*, 600*b*, for example by screws.

The first and second portions 700*a*, 700*b* of the retaining band 700 are also pivoted to the first and second half-shells 800*a*, 800*b*, preferably in a central region of them (FIG. 1), for example by screws. In this situation, when the magnets 400*a*, 400*b* are moved along the respective movement directions "M1", "M2" and the supporting body 600 translates as one with them parallel to the longitudinal axis "A", since the first and second portions 700*a*, 700*b* of the retaining band 700 are pivoted to the first and second housing seats 600*a*, 600*b* and to the half-shells 800*a*, 800*b*, the retaining band 700 undergoes a bending.

Advantageously, the retaining band 700 allows the movement of the magnets 400*a*, 400*b* along the respective movement directions "M1", "M2" and, at the same time, prevents unwanted movement along different directions.

Advantageously, the retaining band 700 also guarantees compactness and seal of the entire transducer 100.

The transducer 100 according to the invention therefore has a small size in the movement direction of the at least magnet one 400*a* (or, if necessary, of the further magnet 400*b* if present).

The transducer 100 according to the invention has a high electromechanical efficiency and good strength as well as a considerable construction simplicity.

The transducer 100 according to the invention has a moderate cost and a modest use of high-quality magnetic materials, since the transducer 100 allows the latter to work at the optimum point of the energy product of the magnet.

The invention also relates to a method for making a transducer 100 for a sound diffuser "C".

The method comprises a step of preparing a transducer 100 comprising a coil 200 provided with a plurality of turns 201 each extending on a respective plane r transversal to a longitudinal axis "A". The turns 201 are juxtaposed along the longitudinal axis "A". The transducer 100 also comprises a ferromagnetic circuit 300 comprising a core provided with a central portion 300*a* around which the coil 200 is wound and an outer lateral portion 300*b* located at the side of the coil 20 and separated from the coil 200 by an air gap "T". The transducer 100 also comprises at least one magnetizable element.

According to a possible embodiment, the transducer 100 comprises a pair of elements which can be magnetized opposite each other and symmetrical relative to the longitudinal axis "A".

The method also comprises a step of positioning the magnetizable element in the air gap "T" and a step of preparing, outside the transducer 100, an auxiliary magnetizing circuit 10 configured to magnetize the magnetizable element.

According to a possible embodiment, the auxiliary circuit 10 has an architecture such as that shown in FIG. 6A. In particular, the auxiliary circuit 10 comprises magnetizing coils 11 which are able to create a magnetic field which is able to magnetize the magnetizable element.

The method then comprises a step of magnetizing the at least one magnetizable element by activating the auxiliary magnetizing circuit 10 in such a way as to make a permanent magnet 400*a* (or if there is the further magnetizable element, a further permanent magnet 400*b*).

Advantageously, the possibility of magnetizing the magnetizable element once inside the transducer 100 makes it possible to facilitate the assembly of the transducer 100.

The description also relates to a sound diffuser "C" comprising a housing 20.

According to the embodiment illustrated, the housing 20 has a circular shape in cross section. Alternatively, the housing 20 may have, in cross section, any shape.

Figure 8:
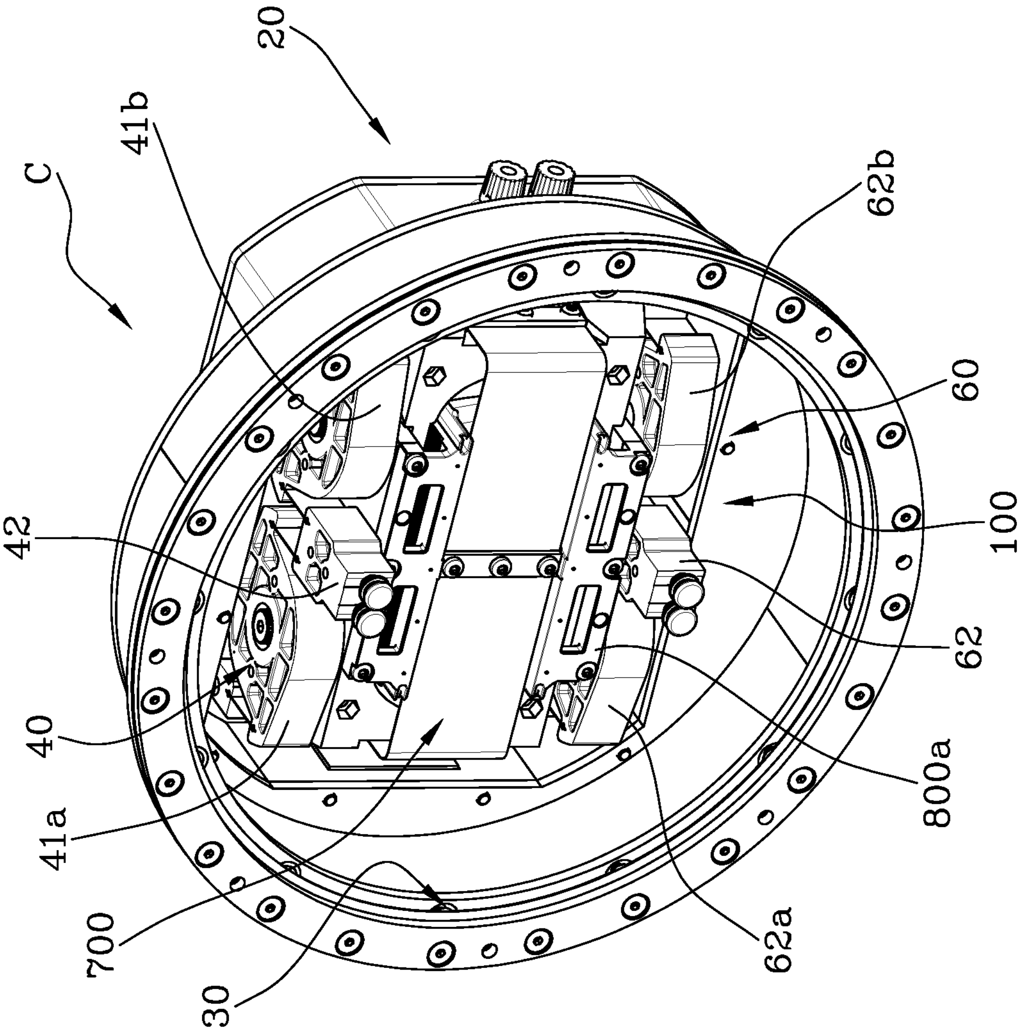
FIG. 8 is a perspective view of a sound diffuser in which the transducer is positioned.
Figure 9:
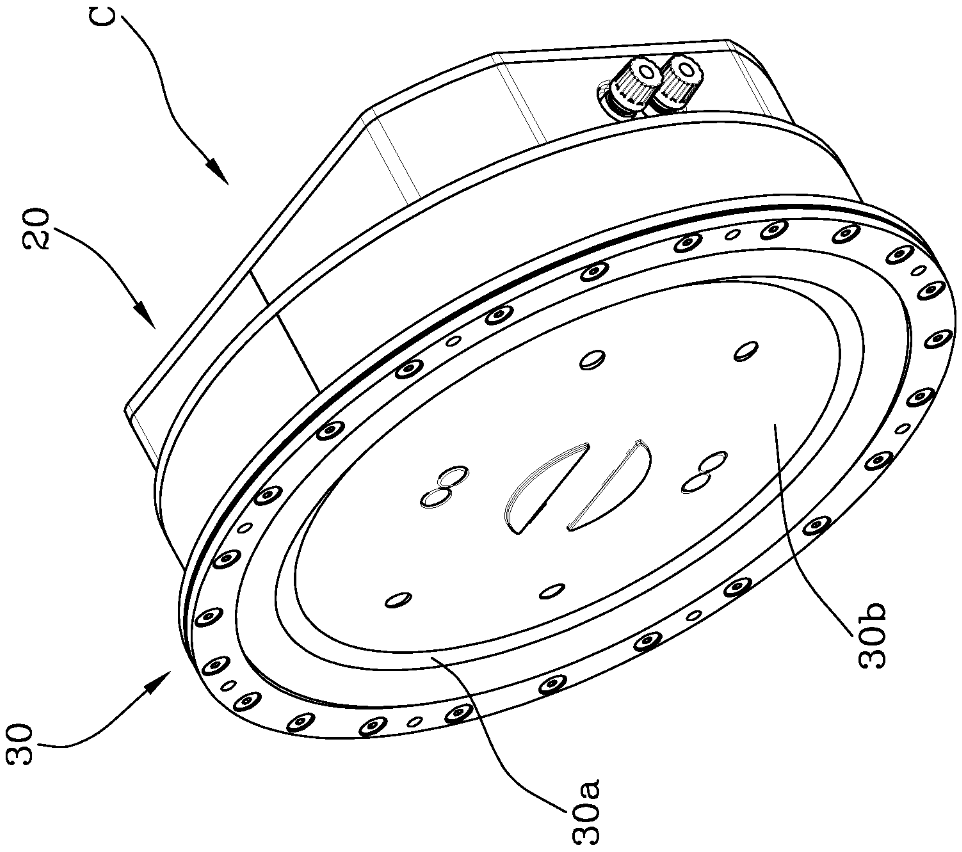
FIG. 9 is a schematic perspective view of a sound diffuse made according to the invention.

The sound diffuser "C" also comprises a transducer 100 located inside the housing 20 (FIG. 8) and comprising a coil 200 and at least one magnet 400*a*, preferably a permanent magnet, movable with reciprocating motion along a movement direction "M1" under the action of a magnetic field generated by the coil 200.

For example, the sound diffuser "C" may comprise a transducer 100 as described above.

According to the embodiment illustrated in the accompanying drawings, the sound diffuser "C" comprises a transducer 100 according to the embodiment of FIGS. 1 to 4.

The sound diffuser "C" also comprises a radiant structure 30 comprising a suspension 30*a* connected to the housing 20 and a radiator 30*b* connected to the suspension 30*a*.

The suspension 30*a* is configured to allow the radiator 30*b* to oscillate relative to the housing 20.

In particular, the suspension 30*a* allows the radiator 30*b* to move with reciprocating motion along a longitudinal axis "A" parallel to the movement direction "M1" of the at least one magnet 400*a*.

In this situation, the radiator 30*b* is operatively coupled to the at least one magnet 400*a* in such a way that a movement of the magnet 400*a* along the movement direction "M1" parallel to the longitudinal axis "A" corresponds to an oscillation of the radiator 30*b* along the longitudinal axis "A".

More in detail, the sound diffuser "C" comprises a mechanical transmission comprising at least one actuating member 40 interposed between at least one magnet 400*a* and the radiator 30*b* for moving the radiator 30*b* in the opposite direction relative to the at least one magnet 400*a*.

In other words, the actuating member 40 is such that a movement of the magnet 400*a* along the movement direction "M1" in one direction corresponds to a movement of the radiator 30*b* along the longitudinal axis "A" in the opposite direction.

Advantageously, in this way, it is possible to balance the inertia forces acting on the sound diffuser "C" avoiding unwanted vibrations, as described below. According to an aspect of the invention, the actuating member 40 comprises a pair of rotary members 41*a*, 41*b* pivoted to the transducer 100.

In more detail, the rotary members 41*a*, 41*b* of the actuating member 40 are each pivoted at a connecting point "P" on the outer lateral wall 300*b* of the ferromagnetic circuit 300 of the transducer 100 (FIG. 1).

According to an aspect of the invention, at the connecting points "P", the rotary members 41*a*, 41*b* are pivoted by means of pins. Preferably, there are ball or roller bearings interposed between the pins and the rotary members 41*a*, 41*b*.

Alternatively, the rotary members 41*a*, 41*b* are associated with the outer lateral wall 300*b* by means of a conforming mechanism, that is to say, a flexible mechanism which reaches the transmission of force and movement through the elastic deformation of the body of the actuating member 40. For example, the conforming mechanism may be made as described in Italian patent application No. 102021000001487 in the name of the same Applicant as this invention, the contents of which are incorporated herein by reference. According to the conforming mechanism described in that patent application, one end of the conforming mechanism is connected to a passive radiant panel and another end is connected to a mass (for compensation); when this type of conforming mechanism is used in this solution, the first end is connected to the radiator 30*b* (which in this case has an active role in generating the sound waves) and the other end of the conforming mechanism is connected (directly or indirectly) to the magnet 400*a* (and therefore to the masses integral with the magnet 400*a*); in particular, if there are two magnets, there are two conforming mechanisms, one for each magnet.

In this situation, by means of an elastic deformation of the actuating member 40, it is possible to transmit the movement (that is, the translation) of the magnet 400*a* to the radiator 30*b* of the transducer 100 in such a way that the radiator 30*b* is also moved.

Alternatively, it is possible to provide a combination of conforming mechanisms and/or systems with sliding or rolling. In this situation, it avoids the introduction of an appreciable mass and maintains the linearity of the movement of the transducer 100.

According to the embodiment shown in the accompanying drawings, the rotary members 41*a*, 41*b* of the pair are juxtaposed along an alignment direction transversal to the longitudinal axis "A".

In other words, the rotary members 41*a*, 41*b* of the pair are connected to the outer lateral wall 300*b* of the ferromagnetic circuit 300 in such a way that their connecting points "P" are aligned along an alignment direction transversal to the longitudinal axis "A" and parallel to the main direction of extension "X".

Preferably, the rotary members 41*a*, 41*b* of the actuating member 40 have a substantially round shape wherein the connecting point "P" occupies a central position.

The rotary members 41*a*, 41*b* are counter-rotating to each other in response to the movement of the at least one magnet 400*a* along the movement direction "M1".

As shown in FIG. 1, the actuating member 40 also comprises a connecting body 42 integral with the radiator 30*b*.

The connecting body 42 is movable with reciprocating motion along a direction parallel to the longitudinal axis "A" for moving the radiator 30*b*.

According to an aspect of the invention, the connecting body 42 is interposed between the rotary members 41*a*, 41*b* of the pair of rotary members and the radiator 30*b*.

As shown in FIG. 1, the rotary members 41*a*, 41*b* of the pair are positioned symmetrically relative to the connecting body 42.

More in detail, the connecting body 42 is operatively connected to the rotary members 41*a*, 41*b* of the pair of rotary members in such a way that a rotation of the rotary members 41*a*, 41*b* corresponds to a movement (in reciprocating translation) of the connecting body 42, as described below.

According to an aspect of the invention, the mechanical transmission constitutes a homokinetic inverter so that a movement of the at least one magnet 400*a* along the movement direction "M1" in a first direction, corresponds to a simultaneous movement in a second direction, opposite to the first direction, of the radiator 30*b* along the longitudinal axis "A". In this situation, the stroke of the radiator 30*b* and the stroke of the at least one magnet 400*a* have a different amplitude to each other.

In more detail, the homokinetic inverter makes it possible to transform the translation movement of the magnet 400*a* in a first direction, into a translation movement of the radiator 30*b* in a second direction opposite to the first direction.

In use, therefore, a translation of the magnet 400*a* in the first direction causes a rotation of the rotary members 41*a*, 41*b* and therefore a translation of the connecting body 42 in a second direction opposite to the first direction. The movements of the magnet 400*a* and of the radiator 30*b* are therefore simultaneous and directed along the same direction (or parallel directions) but have opposite senses.

It should be noted that the amplitude of these movements may be equal to or different (that is, a translation of the radiator 30*b* by a first amplitude, corresponds to a translation of the magnet 400*a* by a second amplitude, wherein the first amplitude and the second amplitude may be equal, or the first amplitude may be less than or greater than the second amplitude) and this means that the transmission ratio given by the homokinetic inverter is unitary or not unitary. According to an example, the mass of the radiator 30*b* is less than that of the magnet 400*a* (and of the transducer 100) and the amplitude of the stroke of the radiator 30*a* is correspondingly greater than that of the magnet 400*a*.

This aspect is particularly advantageous since in order to have large strokes it is not necessary to excessively increase the mass of the transducer 100 or of the radiator 30*b*.

According to the preferred embodiment, the connecting body 42 is connected to each of the rotary members 41*a*, 41*b* of the pair by means of compensating plates 50 extending parallel to the longitudinal axis "A".

The compensating plates 50 are at least partly flexible to compensate for movements of the connecting body 42 along directions transversal to the longitudinal axis "A".

As shown in the accompanying drawings, the rotary members 41*a*, 41*b* of the pair each have a point of connection to a respective compensating plate 50 in such a way that the latter extends between the connecting point and the connecting body 42.

According to the embodiment illustrated in the accompanying drawings, the actuating member 40 comprises further compensating plates 50 configured for connecting the at least one magnet 400*a* to the rotary members 41*a*, 41*b* of the pair.

According to the embodiment shown in FIG. 1, wherein the transducer comprises the supporting body 600, the rotary members 41*a*, 41*b* of the pair are connected to it by respective compensating plates 50 in such a way that a translation of the supporting body 600 corresponds to a rotation of the rotary members 41*a*, 41*b*.

In use, when current is passed inside the coil 200 of the transducer 100, an magnetic energizing field is generated. The magnetic energizing field disturbs or modifies the magnetic field of the at least one magnet 400*a* causing the reciprocating motion of the latter along the movement direction "M1".

In this situation, since the rotary members 41*a*, 41*b* of the pair are operatively connected to the at least one magnet 400*a*, a movement of the latter corresponds to a rotation of the rotary members 41*a*, 41*b* about the connecting points "P".

When rotating, the rotary members 41*a*, 41*b* transmit, by means of the compensating plates 50, the motion to the connecting body 42 which translates along a direction parallel to the movement direction "M1". In particular, if the at least one magnet 400*a* rises, the connecting body 42 is lowered whilst, if the at least one magnet 400*a* lowers, the connecting body 42 rises.

In other words, the rotary members 41*a*, 41*b*, when rotating, cause a reversal of the motion of the at least one magnet 400*a* such as to cause a movement of the connecting body 42 (and hence of the radiator 30*b* of the sound diffuser "C" connected to it) in the opposite direction.

Advantageously, by means of the mechanical transmission described above, it is possible to balance the forces in such a way as to create an inertly balanced system, without mechanical vibrations generated by the movement of the system.

Advantageously, since the mass of the transducer 100 is comparable with the mass of the sound coupling systems of the sound diffuser "C", it is convenient to use a mechanical transmission such as the one described above, that is to say, a transmission which is able to reverse the motion and which allows the masses to be to be opposed in an inertial manner in such a way that the sound diffuser "C" is balanced, minimizing the mechanical vibrations produced during the operation.

Advantageously, the transmission unit 40 as described above prevents the introduction of non-linearity in the transfer of movement and forces between the transducer 100 and the radiant structure 30.

According to the preferred embodiment illustrated in the accompanying drawings, the transducer 100 comprises a further magnet 400*b* movable simultaneously with the magnet 400*a*. The further magnet 400*b* is movable with reciprocating motion along a further movement direction "M2" parallel to the movement direction "M1". In this situation, the mechanical transmission comprises a further actuating member 60 interposed between the further magnet 400*b* and the radiator 30*b* for moving the radiator 30*b* in the opposite direction relative to the further magnet 400*b*.

According to a possible embodiment, the further actuating member 60 also constitutes a homokinetic inverter.

As shown in FIG. 1, the actuating member 40 and the further actuating member 60 are positioned symmetrically relative to the transducer 100.

Moreover, in use, since the magnet 400*a* and the further magnet 400*b* are simultaneously movable, the actuating member 40 and the further actuating member 60 are movable simultaneously according to the method described above for the actuating member 40.

More in detail, when the coil 200 is energized by a current, it generates an magnetic energizing field such as to disrupt the balance of the transducer 100. In this situation, the magnet 400*a* and the further magnet 400*b* move simultaneously along the respective movement directions "M1", "M2" with reciprocating motion (raising and lowering) causing the rotation of the pair of rotary members 41*a*, 41*b*, 61*a*, 61*b* of each of the actuating members 40, 60.

The rotation of the rotary members 41*a*, 41*b*, 61*a*, 61*b* in turn causes the movement of the supporting bodies 42, 62 of each actuating member 40, 60. In particular, the supporting bodies 42, 62 are moved in the opposite direction to that of the magnet 400*a* and of the further magnet 400*b* in such a way that there is an inertial balancing of the sound diffuser "C". In this situation, the radiator 30*b* of the sound diffuser "C" is moved simultaneously and together with the supporting bodies 42, 62 in such a way that it is also moved in the opposite direction relative to the magnets 400*a*, 400*b*.

Figure 7:
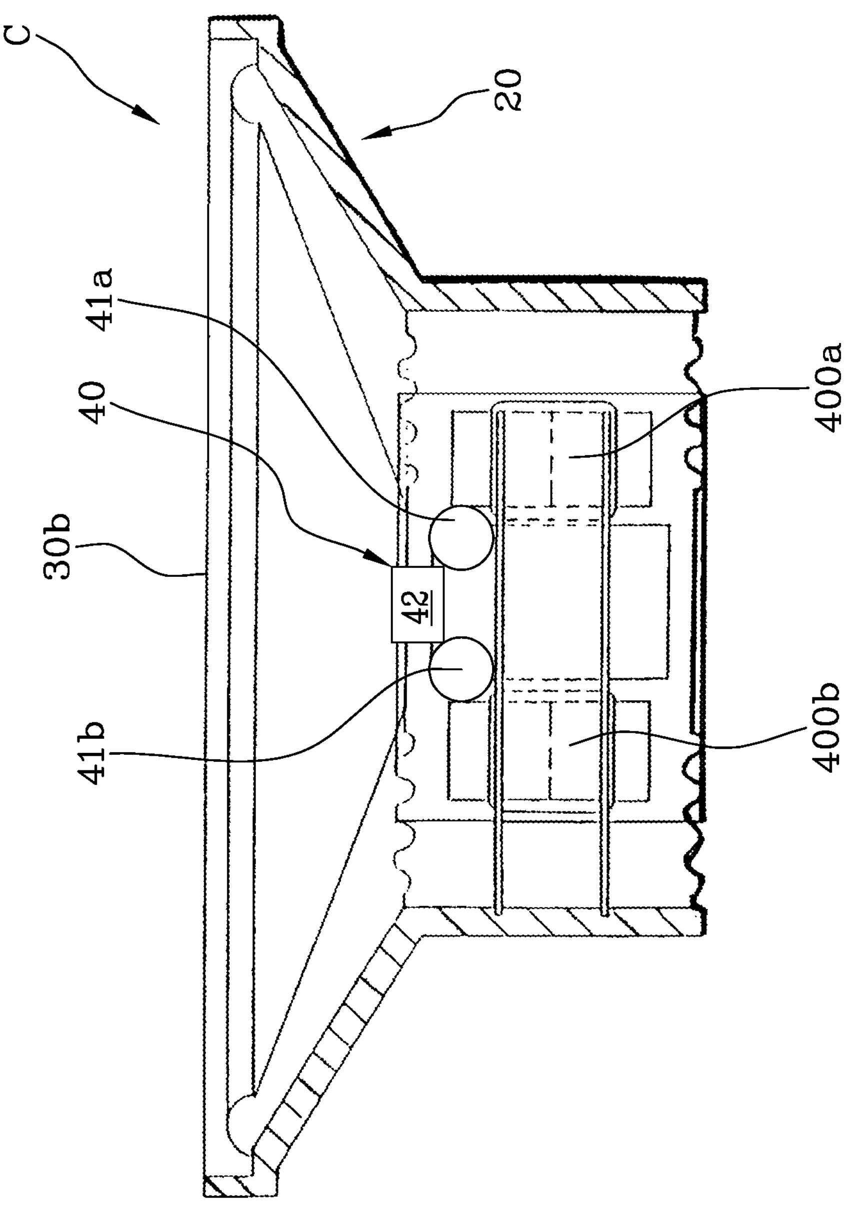
FIG. 7 shows a cross-section of a prior art sound diffuser to which a mechanical transmission according to the invention has been applied as a retrofit.

Advantageously, as also illustrated in FIG. 7, the mechanical transmission may be applied in retrofit to movable magnet transducers of the prior art sound diffusers.

The invention also relates to a method for extending the response at the low frequencies of a sound diffuser "C". The method comprises a step of preparing a sound diffuser "C" comprising a housing 20 and a transducer 100 located inside the housing 20. The transducer 100 comprises a coil 200 and at least one magnet 400*a*.

According to a possible embodiment, the transducer 100 is made as described above.

The sound diffuser "C" also comprises a radiant structure 30 including a suspension 30*a* connected to the housing 20 and a radiator 30*b* connected to the suspension 30*a*.

The suspension 30*a* is configured to allow the radiator 30*b* to move, in particular to move with reciprocating motion.

The sound diffuser "C" also comprises a mechanical transmission comprising at least one actuating member 40 operatively interposed between the magnet 400*a* and the radiator 30*b*.

According to the preferred embodiment, the actuating member 40 is made as described above.

The method comprises a step of generating, using the coil 200, a magnetic energizing field for moving the magnet 400*a* with reciprocating motion along a movement direction "M1".

Preferably, the magnetic energizing field is generated by passing current inside the coil 200.

The method then comprises a step of transmitting the movement of the magnet 400*a* to the radiator 30*b* by means of the mechanical transmission. In this situation, the method comprises a step of moving the radiator 30*b* with reciprocating motion along a longitudinal axis "A" parallel to the movement direction "M1" in the opposite direction relative to the magnet 400*a*.

According to an aspect of the invention, the mechanical transmission constitutes a homokinetic inverter. In this situation, the transmission step comprises a sub-step of moving the at least one magnet 400*a* along the movement direction "M1" in a first direction and a sub-step of moving the radiator 30*b* along the longitudinal axis "A" in a second direction, opposite to the first direction. The movement steps are simultaneous with each other. In this situation, the mechanical transmission defines a non-unitary transmission ratio wherein the stroke of the radiator 30*b* has an amplitude different from the amplitude of the stroke of the magnet 400*a*.

Alternatively, the mechanical transmission defines a unitary transmission ratio wherein the stroke of the radiator 30*b* has an amplitude equal to the amplitude of the stroke of the magnet 400*a*.

FIGS. 10A, 10B and 10C show a sound diffuser C comprising a housing body 20, a suspension 30*a* and a radiator 30*b*; in FIGS. 10B and 10C, a transducer 100 can be seen located inside the housing body 20.

According to an embodiment, the coil 200 comprises a first rectilinear portion 200*a*, a second rectilinear portion 200*b*, a third rectilinear portion 200*c* and a fourth rectilinear portion 200*d*. The first 200*a*, the second 200*b*, the third 200*c* and the fourth 200*d* rectilinear portions are joined together by curved connection sections.

The first rectilinear portion 200*a* and the second rectilinear portion 200*b* are mutually facing and the third rectilinear portion 200*c* and the fourth rectilinear portion 200*d* are mutually facing. The rectilinear portions all lie on the same plane transverse to the longitudinal axis A and are arranged symmetrically with respect to the longitudinal axis A.

In the examples illustrated, the rectilinear portions define a square in a plane transverse to the longitudinal axis.

The outer lateral portion 300*b* comprises a first part 300*b*', a second part 300*b*", a third part 300*b*"' and a fourth part 300*b*"". The first 300*b*', second 300*b*", third 300*b*"' and fourth 300*b*"" part are separated from each other and placed laterally to (or to the side of) the first 200*a*, the second 200*b*, the third 200*c* and the fourth 200*d* rectilinear portion of the coil 200, respectively, so as to define a plurality of air gaps T.

In some embodiments, the transducer 100 comprises a plurality of magnets; in particular, it comprises a first magnet 400*a*, a second magnet 400*b*, a third magnet 400*c* and a fourth magnet 400*d*. The first magnet 400*a* is placed in a corresponding air gap of the plurality of air gaps T, between the first rectilinear portion 200*a* and the first part 300*b*'. The second magnet 400*b* is placed in a corresponding air gap of the plurality of air gaps T, between the second rectilinear portion 200*b* and the second part 300*b*". The third magnet 400*c* is placed in a corresponding air gap of the plurality of air gaps T, between the third rectilinear portion 200*c* and the third part 300*b*"'. The fourth magnet 400*d* is placed in a corresponding air gap of the plurality of air gaps T, between the fourth rectilinear portion 200*d* and the fourth part 300*b*"".

The first magnet 400*a* is movable within the air gap T along a first movement direction M1 parallel to the longitudinal axis A. The second magnet 400*b* is movable within the air gap T along a second movement direction M2 parallel to the longitudinal axis A. The third magnet 400*a* is movable within the air gap T along a third movement direction M3 parallel to the longitudinal axis A. The fourth magnet 400*d* is movable within the air gap T along a fourth movement direction M4 parallel to the longitudinal axis A.

Therefore, when the coil 200 is energized to generate the excitation magnetic field, a movement of the magnets 400*a*, 400*b*, 400*c*, 400*d* is induced along the respective movement directions M1, M2, M3 and M4. The movement of the magnets along the directions of movement (parallel to each other) causes an oscillation of the radiator 30*b* of the sound diffuser C in which the transducer 100 is located.

Each magnet 400*a*, 400*b*, 400*c*, 400*d* extends along a direction transverse to the longitudinal axis A and parallel to the respective rectilinear portion 200*a*, 200*b*, 200*c*, 200*d*.

The magnets are joined together by respective angular elements 900, located in correspondence with the curved connection sections of the coil 200, so as to form a rigid structure movable along the longitudinal direction. In particular, the rigid structure does not allow movement along a direction transverse to the longitudinal axis A (i.e. along any direction transverse to the longitudinal axis A), while it allows movement along the longitudinal direction.

Each magnet 400*a*, 400*b*, 400*c*, 400*d* therefore has a transversal extension with respect to the longitudinal axis A and a longitudinal extension. In fact, each magnet 400*a*, 400*b*, 400*c*, 400*d* has two opposite faces, extending along the longitudinal direction between a first end 400*a*' and a second end 400*a*". Furthermore, each magnet 400*a*, 400*b*, 400*c*, 400*d* has a south pole "Sa" and a north pole "Na" extending between the first end 400*a*' and the second end 400*a*". When the magnets 400*a*, 400*b*, 400*c*, 400*d* are placed within the air gap T, the first magnet 400*a* and the second magnet 400*b* have the same pole facing the first rectilinear portion 200*a* and the second rectilinear portion 200*b* and the third magnet 400*c* and the fourth magnet 400*d* have the same pole facing the third rectilinear 200*c* and the rectilinear portion 200*d*.

In particular, according to an example, the sound diffuser C comprises four guide devices, each of which is coupled to an angular element 900 of the plurality of angular elements 900. The guide devices allow the movement of each magnet 400*a*, 400*b*, 400*c*, 400*d* along the respective movement direction M1, M2, M3, M4. The guide device comprises an external surface 900', defined by the angular element 900. The external surface 900' extends around a guide axis G, parallel to the longitudinal axis A.

The transducer 100 comprises an upper half-shell 800*a* and a lower half-shell 800*b*. The guide device comprises an internal surface 800'. The internal surface 800' is defined by the upper half-shell 800*a*. In particular, the upper half-shell 800*a* comprises four longitudinal portions, inserted inside the angular elements 900 and defining the internal surfaces 800' for the guide devices. Therefore, the internal surfaces 800' extends around the guide axis G. The external surface 900' surrounds the internal surface 800' so as to define a cavity. Each guide device comprises an elastic element M, preferably a spring, closed on itself to form a ring arranged in the cavity in contact with the internal surface 800' and the external surface 900', to roll on them moving longitudinally in response to a relative movement between the internal surface 800' and the external surface 900'. The upper half-shell 800*a* is jointly connected to the core of the ferromagnetic circuit 300; therefore, the internal surface 800' is connected, through the upper half-shell 800*a*, to the core. The angular element 900 is jointly connected to a pair of magnets of the plurality of magnets 400*a*, 400*b*, 400*c* and 400*d*; therefore, the external surface 900' is connected, through the angular element 900, to the pair of magnets to which the angular element 900 is connected. In this way, when the magnets 400*a*, 400*b*, 400*c* and 400*d* move along the respective movement directions M1, M2, M3, M4, the external surface 900' moves jointly with the magnets and slides with respect to the internal surface 800' which remains still, and the elastic element rolls between the external surface 900' and the internal surface 800'.

It is observed that, in one embodiment, the outer lateral portion 300*b* is separated from the core by a plurality of air gaps T extending longitudinally and transversely to the longitudinal direction. The inner lateral portion 300*c* has a high permeability zone near the coil 200, to allow the magnetic field, when the coil 200 is not energized, to close within the inner lateral portion 300*c* and not within the core.

The high permeability zone is defined by a slot I transversal to the longitudinal axis A such as to divide the inner lateral portion 300*c* into an upper sub-portion 300*c*' and a lower sub-portion 300*c*" juxtaposed along a direction parallel to the longitudinal axis A and defining respective pole pieces facing the air gap T.

As shown by way of example in FIGS. 13A and 13B, the core comprises an upper portion and a lower portion. The upper portion and the lower portion cooperate to form the central portion 300*a* of the core, around which the coil 200 is wound, and which extends along the longitudinal axis A. The upper portion and the lower portion define a seat for housing the coil 200. The core protrudes transversely to the longitudinal axis A and away from the longitudinal axis so as to define an upper protrusion zone, which includes the upper sub-portion 300*c*' of the inner lateral portion 300*c*, and a lower protrusion zone, which comprises the bottom sub-portion 300*c*" of the inner lateral portion 300*c*. The upper sub-portion 300*c*' and the lower sub-portion 300*c*" then move towards each other along a direction parallel to the longitudinal axis A for winding at least partially the sides (or walls) of the coil 200 facing towards the air gap T. The upper sub-portion 300*c*' and the lower sub-portion 300*c*" cooperate to define the slot I, which surrounds the longitudinal axis A. In particular, the upper sub-portion 300*c*' and the lower sub-portion 300*c*" can cooperate to wrap around an entire perimeter of the coil 200 except the point in which the slot I is made. Also the slot I can surround the entire perimeter of the coil 200 except the in the points in correspondence with the curved connection sections. Thus, the coil 200 is embedded within (or covered by) the ferromagnetic circuit 300 except for the portion close to the slot I which, on the other hand, faces directly the air gap T (i.e. faces directly on the plurality of air gaps).

Thus, the first 200*a*, the second 200*b*, the third 200*c* and the fourth 200*d* rectilinear portion of the coil 200 are placed laterally to the central portion 300*a* of the core, i.e. the first 200*a*, the second 200*b*, the third 200*c* and the fourth 200*d* rectilinear portion of the coil 200 wrap around the central portion 300*a* of the core.

The first 200*a*, second 200*b*, third 200*c* and fourth 200*d* rectilinear portions of the coil 200 are surrounded, below and above with respect to a plane transverse to the longitudinal axis A and passing through a center of the coil 200, by the upper and lower sub-portions 300*c*', 300*c*" of the inner lateral portion 300*c*.

In particular, in correspondence with the curvilinear connecting portions of the coil 200, the core, in particular the upper sub-portion 300*c*' and the lower sub-portion 300*c*" are interrupted; therefore, the curved connection sections of the coil 200 protrudes with respect to the core outwardly away from the longitudinal axis A.

In addition to the upper half-shell 800*a*, the containment shell 800 also comprises a lower half-shell 800*b*; the upper half-shell 800*a* and the lower half-shell 800*b* are mutually juxtaposed along the longitudinal axis "A" and are configured to engage the first 300*b*', the second 300*b*", the third 300*b*"' and the fourth part 300*b*"" of the outer side portion 300*b*. The upper half-shell 800*a* and the lower half-shell 800*b* can be configured to engage with the central portion 300*c*. FIGS. 14A-14*c* show, purely by way of example, various embodiments of a mechanical transmission. The mechanical transmission can comprise a plurality of actuating members 40 (i.e. a first, a second, a third and a fourth actuating member 40*a*, 40*b*. 40*c*, 40*d*), interposed between a corresponding magnet of the plurality of magnets 400*a*, 400*b*, 400*c*, 400*d* and the radiator 30*b* to move the radiator 30*b*, in the same direction or in the opposite direction relative to the magnets; in this way, a displacement of the magnets along the respective movement direction M1, M2, M3, M4 in one direction corresponds to a displacement of the radiator 30*b* along the longitudinal axis A in a same direction or in an opposite direction.

According to one aspect of the present description, each actuating member 40 of the plurality comprises a single rotary member 41; each individual rotary member 41 is pivoted at a connecting point on a corresponding part of the plurality of parts 300*b*', 300*b*", 300*b*"', 300*b*"" of the outer lateral portion 300*b*. Each actuating member 40 further comprises a connecting body 42 connected to the radiator 30*b*, so as to transmit the movement to the radiator 30*b*.

According to an embodiment, illustrated purely by way of example in FIG. 11, the acoustic diffuser C comprises a radiator 30*b*, a suspension 30*a* and a further radiator 30*b*' and a further suspension 30*a*'. In this case, the actuation member 40 comprises a connecting body 42 connected to the radiator 30*b* and a further connecting body 42' connected to the further radiator 30*b*'.

Illustrated by way of example in FIG. 14C and in FIG. 14D there is a guide device, comprising a retaining band, preferably made of metal and elastically deformable. The retaining band comprises a first section 700*a*, located in correspondence with the first part 300*b*' of the outer lateral portion 300*b*, a second section 700*b*, located in correspondence with the second portion 300*b*", a third section 700*c*, located in correspondence with the third 300*b*"' and a fourth section 700*d*, placed in correspondence with the fourth portion 300*b*"". Each section 700*a*, 700*b*, 700*c*, 700*d* comprises a pair of ends; each end is connected to an angular element 900. In this way, the retaining band perimetrically surrounds the outer lateral portion 300*b*. In the illustrated example, the guide device comprises a plurality of connection elements, to connect a central area of a section 700*a*, 700*b*, 700*c*, 700*d* of the retaining band to a respective part of the outer lateral portion 300*b*. Following a movement of the magnets 400*a*, 400*b*, 400*d*, 400*c* along the movement direction, the angular elements move and the retaining band flexes. The ends of the sections move together with the angular elements 900, while the central area remains stationary.

The invention achieves the preset aims eliminating the drawbacks of the prior art.

In particular, the invention provides a transducer and a sound diffuser having a small overall size in the movement direction of the at least one magnet.

The invention provides a transducer with high electromechanical efficiency and robustness.

The invention provides a transducer which is easy to assemble.

The invention provides a balanced sound diffuser at inertial level even when it operates at low frequencies.

The invention provides a sound diffuser with compact dimensions but with a high SPL value.

The following paragraphs, listed in alphanumeric order for reference, are non-limiting example modes of describing this invention.

A. A transducer (100) for a sound diffuser (C), comprising:

- a coil (200) including a plurality of turns (201), each lying in a respective plane (γ) transverse to a longitudinal axis (A), the turns (201) being juxtaposed along a longitudinal axis (A);
- a ferromagnetic circuit (300), including:
  - a core provided with a central portion (300*a*) around which the coil (200) is wound;
  - an outer lateral portion (300*b*) located at the side of the coil (200) and at least partly surrounding the coil (200), the outer lateral portion (300*b*) being separated from the core by an air gap (T) that extends longitudinally;
- at least one magnet (400*a*) located in the air gap (T) and movable along a movement direction (M1) parallel to the longitudinal axis (A), the magnet (400*a*) being a permanent magnet, the coil (200) being energizable to generate a magnetic energizing field that induces the magnet (400*a*) to move along the movement direction (M1).

A.1. The transducer according to paragraph A, wherein the ferromagnetic circuit (300) comprises an inner lateral portion (300*c*) located at the side of the coil (200) and interposed between the coil (200) and the at least one magnet (400*a*), the inner lateral portion (300*c*) having a high magnetic permeability zone in proximity to the coil (200).

A.1.1. The transducer according to paragraph A.1, wherein said zone is defined by a slot (I) transverse to the longitudinal axis (A) such as to divide the inner lateral portion (300*c*) into an upper sub-portion (300*c*') and a lower sub-portion (300*c*") which are juxtaposed along a direction parallel to the longitudinal axis (A) and define respective pole expansions directed towards the air gap (T).

A.1.1.1. The transducer according to paragraph A.1.1, wherein the upper sub-portion (300*c*') and the lower sub-portion (300*c*") of the inner lateral portion (300*c*) are made as one piece with the core and jut out from the central portion (300*a*) towards the outer lateral portion (300*b*), A.2. The transducer according to any one of the paragraphs from A to A.1.1.1., wherein the at least one magnet (400*a*) has a first end (400*a*') and a second end (400*a*"), the magnet (400*a*) having a south pole (Sa) and a north pole (Na), each extending between the first end (400*a*') and the second end (400*a*") parallel to the longitudinal axis (A).

A.3. The transducer according to any one of the paragraphs from A to A.2, wherein the coil (200) is elongate in shape along a predominant direction of extension (X) that is transverse to the longitudinal axis (A) and wherein the coil (200) comprises a first, rectilinear portion (200*a*), parallel to the predominant direction of extension (X), and a second, rectilinear portion (200*b*), opposite the first rectilinear portion (200*a*) and parallel to the predominant direction of extension (X).

A.3.1. The transducer according to paragraph A.3, comprising a further magnet (400*b*) located in the air gap (T) symmetrically to the magnet (400*a*) about the longitudinal axis (A) and movable along a movement direction (M2) parallel to the longitudinal axis (A), and wherein the outer lateral portion (300*b*) comprises a first and a second part (300*b*', 300*b*") which are separate from each other and located at the side of the coil (200) symmetrically about the longitudinal axis (A).

A.3.1.1. The transducer according to paragraph A.3.1, wherein the magnet and the further magnet (400*a*, 400*b*) face the first and the second rectilinear portion (200*a*, 200*b*), respectively, and are elongate in shape along respective axial directions parallel to the predominant direction of extension (X).

A.3.1.2. The transducer according to paragraph A.3.1 or paragraph A.3.1.1, wherein the magnet and the further magnet (400*a*, 400*b*) have the same pole (Sa, Na, Sb, Nb) facing the coil (200).

A.3.1.3. The transducer according to any one of paragraphs from A.3.1 to A.3.1.2, wherein the first rectilinear portion (200*a*) and the magnet (400*a*) have the same axial dimension and wherein the second rectilinear portion (200*b*) and the further magnet (400*b*) have the same axial dimension.

A.3.1.4. The transducer according to any one of paragraphs from A.3.1 to A.3.1.3, comprising a supporting body (600) that is operatively connected to the magnet (400) and to the further magnet (400*b*) to make the magnet (400*a*) and the further magnet (400*b*) move as one along the respective movement directions (M1, M2).

A.3.1.4.1. The transducer according to paragraph A.3.1.4, comprising a retaining band (700) configured to prevent said supporting body (600) from moving transversely to the longitudinal axis (A).

A.3.1.4.1.1. The transducer according to paragraph A.3.1.4.1, wherein the retaining band (700) is elastically deformable so that moving the supporting body (600) corresponds to bending the retaining band (700).

A.4. The transducer according to any one of paragraphs from A to A.2, wherein:

- the coil (200) is substantially circular in cross section;
- the outer lateral portion (300*c*', 300*c*") has an annular shape defining an outer ring surrounding the coil (200);
- the at least one magnet (400*a*, 400*b*) has an annular shape defining an outer ring surrounding the coil (200);

the coil (200), the outer ring and the magnetic ring being concentric and centred around said longitudinal axis (A).

A.4.1. The transducer according to paragraph A.4 and paragraph A.1, wherein the inner lateral portion has an annular shape defining an inner ring that is concentric with the outer ring.

- a mechanical transmission comprising at least one actuating member (40) interposed between the at least one magnet (400*a*) and the radiator (30*b*) to move the radiator (30*b*) in the opposite sense with respect to the at least one magnet (400*a*).

B. A sound diffuser (C) comprising:

- a housing (20);
- a transducer (100) according to one or more of the preceding paragraphs, located inside the housing (20);
- a radiator (30*b*);
- a suspension (30*a*) configured to allow the radiator (30*b*) to oscillate relative to the housing (20), wherein the radiator (30*b*) is operatively coupled to the at least one magnet (400) so that a movement of the magnet (400*a*) along the movement direction (M1) parallel to the longitudinal axis (A) corresponds to an oscillation of the radiator (30*b*) along said longitudinal axis (A).

B.1. The sound diffuser according to paragraph B, comprising a mechanical transmission comprising at least one actuating member (40) interposed between the at least one magnet (400*a*) and the radiator (30*b*) to move the radiator (30*b*) in the opposite sense with respect to the at least one magnet (400*a*).

B.1.1. The sound diffuser according to paragraph from B.1, wherein the actuating member (40) comprises a pair of rotary members (41*a*, 41*b*) pivoted to the transducer (100), the rotary members (41*a*, 41*b*) being counter-rotating relative to each other, responsive to the movement of the magnet (400*a*) along the movement direction (M1).

B.1.1.1. The sound diffuser according to paragraph B. 1.1, wherein the rotary members (41*a*, 41*b*) of the pair of rotary members are juxtaposed with each other along an alignment direction transverse to the longitudinal axis (A).

B.1.2. The sound diffuser according to any of the paragraph from B.1 to B.1.1.1, wherein the actuating member (40) comprises a connecting element (42) integral with the radiator (30*b*), the connecting body (42) being movable with reciprocating motion along a direction parallel to the longitudinal axis (A) to move the radiator (30*b*).

B.1.2.1 The sound diffuser according to the paragraphs B.1.2 and B.1.1, wherein the connecting body (42) is operatively connected to the rotary members (41*a*, 41*b*) of the pair of rotary members so that one ration of the rotary members (41*a*, 41*b*) corresponds to the movement of the connecting body (42).

B.1.2.1.1. The sound diffuser according to paragraph B.1.2.1, wherein the connecting body (42) is interposed between the rotary members (41*a*, 41*b*) of the pair of rotary members and the radiator (30*b*) and wherein the rotary members (41*a*, 41*b*) of the pair of rotary members are disposed symmetrically relative to the connecting body (42).

B.1.2.1.2. The sound diffuser according to paragraph B.1.2.1. or B.1.2.1.1, comprising compensating plates (50) extending parallel to the longitudinal axis (A) and connecting the connecting body (42) to each of the rotary members (41*a*, 41*b*) of the pair of rotary members, the compensating plates (50) being at least partly flexible to compensate for movements of the connecting body (42) along directions transverse to the longitudinal axis (A).

B.1.3. The sound diffuser according to any of the paragraph from B.1 and to paragraph A.3.1, wherein the mechanical transmission comprises a further actuating member (60), interposed between the further magnet (400*b*) and the radiator (30*b*) to move the radiator (30*b*) in the opposite sense with respect to the further magnet (400*b*), the actuating member (40) and the further actuating member (60) being disposed symmetrically relative to the transducer (100).

B.1.4. The sound diffuser according to any one of the paragraphs from B.1 a B.1.3, wherein the mechanical transmission constitutes a homokinetic inverter whereby a movement of the at least one magnet (400*a*) along the movement direction (M1) in a first sense, corresponds to a simultaneous movement in a second sense, opposite to the first sense, of the radiator (30*b*) along the longitudinal axis (A), the stroke of the radiator (30*b*) and the stroke of the at least one magnet (400*a*) being equal or different in length.

C. A method for making a transducer (100) for a sound diffuser (C), comprising the following steps:

- preparing a transducer (100) comprising:
  - a coil (200) comprising a plurality of turns (201), each extending in a respective plane (γ) transverse to a longitudinal axis (A), the turns (201) being juxtaposed along a longitudinal axis (A);
  - a ferromagnetic circuit (300) comprising:
    - a core provided with a central portion (300*a*) around which the coil (200) is wound;
    - an outer lateral portion (300*b*) located at the side of the coil (200) and separated from the coil (200) by an air gap (T);
  - at least one magnetizable element;
- positioning the magnetizable element in the air gap (T);
- preparing an auxiliary magnetizing circuit (10) on the outside of the transducer (100) and configured to magnetize the magnetizable element;
- magnetizing the magnetizable element located in the air gap (T) by activating the auxiliary magnetizing circuit (10) in order to make a permanent magnet (400*a*).

D. A method for extending the low frequency response of a sound diffuser (C), wherein the method comprises the following steps:

preparing a sound diffuser (C) comprising:

a housing (20);

a transducer (100) located inside the housing (20) and comprising a coil (200) and at least one magnet (400*a*);

a radiator (30*b*) connected to the housing (20) and movable with reciprocating motion along a longitudinal axis (A);

a mechanical transmission comprising at least one actuating member (40) operatively interposed between the magnet (400*a*) and the radiator (30*b*);

generating, through the coil (200), a magnetic energizing field for moving the magnet (400*a*) with reciprocating motion along a movement direction (M1) parallel to the longitudinal axis (A);

5-transmitting the movement of the magnet (400*a*) to the radiator (30*b*) by means of the mechanical transmission;

moving the radiator (30*b*) with reciprocating motion along the longitudinal axis (A) in the opposite sense relative to the magnet (400*a*).

D.1. The method according to paragraph D, wherein the mechanical transmission constitutes a homokinetic inverter and wherein the step of transmitting comprises the following sub-steps:

moving the at least one magnet (400*a*) along the movement direction (M1) in a first direction;

moving the radiator (30*b*) along the longitudinal axis (A) in a second sense, opposite the first sense;

the movement steps being simultaneous with each other.

D.2. The method according to paragraph D or D.1, wherein the mechanical transmission defines a unitary or non-unitary transmission ratio where the stroke of said radiator (30*b*) and the stroke of the at least one magnet (400*a*) are equal or different in length.

What is claimed is:

1. A sound diffuser comprising:

a housing;

a transducer located inside the housing and including:

a coil including a plurality of turns, each lying in a respective plane transverse to a longitudinal axis, the turns being juxtaposed along the longitudinal axis and surrounding the longitudinal axis, the coil including a plurality of rectilinear portions transverse to the longitudinal axis, having a first, a second, a third and a fourth rectilinear portion, joined together by respective curved connection sections, wherein the first and the second rectilinear portions are mutually facing and the third and fourth rectilinear portions are mutually facing;

a ferromagnetic circuit, including a core, provided with a central portion around which the coil is wound, and an outer lateral portion located at the side of the coil and at least partly surrounding the coil and comprising a plurality of parts surrounding the coil, cooperating with the corresponding plurality of rectilinear portions to define a plurality of air gaps extending longitudinally and including a first, a second, a third and a fourth part;

a plurality of magnets, each magnet of the plurality of magnets being located in a respective air gap of the plurality of air gaps, the plurality of magnets comprising a first magnet, placed between the first rectilinear portion and the first part, a second magnet, placed between the second rectilinear portion and the second part, a third magnet, placed between the third rectilinear portion and the third part, and a fourth magnet, placed between the fourth rectilinear portion and the fourth part, the first, the second, the third and the fourth magnet being movable along respective movement directions, parallel to the longitudinal axis, the coil being energizable to generate a magnetic energizing field that induces the plurality of magnets to move along the respective movement directions;

a radiator; and a suspension configured to allow the radiator to oscillate relative to the housing, wherein the radiator is operatively coupled to the plurality of magnets so that a movement of the plurality of magnets along the respective movement directions parallel to the longitudinal axis corresponds to an oscillation of the radiator along said longitudinal axis.

2. The sound diffuser according to claim 1, wherein each magnet of the plurality extends along a direction transverse to the longitudinal axis and parallel to the respective rectilinear portion, the magnets of the plurality of magnets being joined together by respective angular elements, located at the curved connection sections of the coil, to form a rigid structure movable along the longitudinal direction.

3. The sound diffuser according to claim 2, comprising four guide devices, each of which being coupled to an angular element, to allow the movement of each magnet of the plurality of magnets along the respective movement direction.

4. The sound diffuser according to claim 3, wherein each guide device comprises:

an internal surface, extending around a guide axis longitudinally oriented, the internal surface being connected to the core;

an external surface, extending around the guide axis, surrounding the internal surface to define a cavity and connected to a pair of magnets of the plurality of magnets;

an elastic element, closed on itself to form a ring, arranged in the cavity in contact with the internal surface and the external surface, to roll on them moving longitudinally in response to a relative movement between the internal surface and the external surface.

5. The sound diffuser according to claim 1, wherein each magnet of the plurality has a first end and a second end opposite to the longitudinal direction, and a south pole and a north pole, each of the north and south poles extending between the first end and the second end parallel to the longitudinal axis, in which the magnet and the further magnet have the same pole facing the coil and the third magnet and the fourth magnet have the same pole facing the coil.

6. The sound diffuser according to claim 1, wherein the ferromagnetic circuit comprises an inner lateral portion located at the side of the coil and interposed between the coil and the at least one magnet, the inner lateral portion having a high magnetic permeability zone in proximity to the coil.

7. The sound diffuser according to claim 6, wherein said zone is defined by a slot transverse to the longitudinal axis such as to divide the inner lateral portion into an upper sub-portion and a lower sub-portion which are juxtaposed along a direction parallel to the longitudinal axis and define respective pole expansions directed towards the air gap.

8. The sound diffuser according to claim 7, wherein the upper sub-portion and the lower sub-portion of the inner lateral portion are made as one piece with the core and jut out from the central portion towards the outer lateral portion.

9. The sound diffuser according to claim 7, wherein the core extends along the longitudinal axis, to define the central portion, and protrudes transversely with respect to the longitudinal axis and away from the longitudinal axis to define an upper protrusion zone comprising the upper sub-portion and a lower protrusion zone comprising the lower sub-portion, the upper protrusion zone and the lower protrusion zone surrounding inferiorly and superiorly the coil in a simmetrical way with respect to a plane transversal to the longitudinal axis and passing through a center of the coil.

10. The sound diffuser according to claim 1, comprising a mechanical transmission including at least one actuating member interposed between the at least one magnet and the radiator to move the radiator in the direction opposite to the at least one magnet.

11. The sound diffuser according to claim 1, wherein the core is made by a sintered magnetic composite, SMC.

12. The sound diffuser according to claim 1, comprising a guide device including:

an internal surface, extending around a guide axis longitudinally oriented;

an external surface, extending around the guide axis, surrounding the internal surface to define a cavity;

an elastic element, closed on itself to form a ring, arranged in the cavity in contact with the internal surface and the external surface, to roll on them moving longitudinally in response to a relative movement between the internal surface and the outer surface, wherein the internal surface is connected to the core and the external surface is connected to the at least one magnet, or vice versa.

13. The sound diffuser according to claim 1, wherein, in a cross-sectional plane to the longitudinal axis, the magnets of the plurality of magnets are arranged as the sides of a regular polygon, wherein the regular polygon is inscribed in a circle having a center passing through the longitudinal axis.

14. The sound diffuser according to claim 1, wherein the coil is a single coil and the central portion extends along the longitudinal axis.

15. A sound diffuser comprising:

a housing;

a transducer located inside the housing and including:

a coil including a plurality of turns, each lying in a respective plane transverse to a longitudinal axis, the turns being juxtaposed along the longitudinal axis;

a ferromagnetic circuit, including a core, provided with a central portion around which the coil is wound, and an outer lateral portion located at the side of the coil and at least partly surrounding the coil, the outer lateral portion being separated from the core by an air gap that extends longitudinally; and at least one magnet located in the air gap and movable along a movement direction parallel to the longitudinal axis, the magnet being a permanent magnet, the coil being energizable to generate a magnetic energizing field that induces the magnet to move along the movement direction;

a radiator;

a suspension configured to allow the radiator to oscillate relative to the housing, and a guide device including:

an internal surface, extending around a guide axis longitudinally oriented;

an external surface, extending around the guide axis, surrounding the internal surface to define a cavity; and an elastic element, closed on itself to form a ring, arranged in the cavity in contact with the internal surface and the external surface, to roll on them moving longitudinally in response to a relative movement between the internal surface and the outer surface, wherein the internal surface is connected to the core and the external surface is connected to the at least one magnet, or vice versa, wherein the radiator is operatively coupled to the at least one magnet so that a movement of the magnet along the movement direction parallel to the longitudinal axis corresponds to an oscillation of the radiator along said longitudinal axis.

* * * * *